United States Patent
Georgelos

(10) Patent No.: US 10,526,190 B2
(45) Date of Patent: Jan. 7, 2020

(54) MULTILAYER FILM USED WITH FLEXIBLE PACKAGING

(71) Applicant: DS Smith Plastics Limited, London (GB)

(72) Inventor: Paul N. Georgelos, Naperville, IL (US)

(73) Assignee: DS Smith Plastics Limited, London (GB)

( * ) Notice: Subject to any disclaimer, the term of this patent is extended or adjusted under 35 U.S.C. 154(b) by 0 days.

(21) Appl. No.: 16/367,612

(22) Filed: Mar. 28, 2019

(65) Prior Publication Data

US 2019/0256340 A1 Aug. 22, 2019

Related U.S. Application Data

(63) Continuation of application No. 15/097,504, filed on Apr. 13, 2016.
(Continued)

(51) Int. Cl.
*B67D 3/00* (2006.01)
*B32B 27/18* (2006.01)
(Continued)

(52) U.S. Cl.
CPC .............. *B67D 3/0067* (2013.01); *B32B 3/08* (2013.01); *B32B 3/266* (2013.01); *B32B 7/12* (2013.01); *B32B 27/08* (2013.01); *B32B 27/18* (2013.01); *B32B 27/306* (2013.01); *B32B 27/32* (2013.01); *B32B 27/327* (2013.01); *B32B 27/34* (2013.01);
(Continued)

(58) Field of Classification Search
CPC .................................................. B67D 3/0067
See application file for complete search history.

(56) References Cited

U.S. PATENT DOCUMENTS

| 3,191,820 A | 6/1965 | Kuster |
| 3,263,875 A | 8/1966 | Lofdahl |

(Continued)

FOREIGN PATENT DOCUMENTS

| AU | 2009271582 | 1/2010 |
| AU | 2010266321 | 1/2011 |

(Continued)

OTHER PUBLICATIONS

Patent Cooperation Treaty, Notification Concerning Transmittal of International Preliminary Report on Patentability (Chapter 1 of the Patent Cooperation Treaty), Application No. PCT/IB2016/000909, dated Oct. 26, 2017 (11 pages).

(Continued)

*Primary Examiner* — J C Jacyna
(74) *Attorney, Agent, or Firm* — McAndrews, Held & Malloy, Ltd.

(57) ABSTRACT

This disclosure describes a multilayer plastic film useful in packaging. The film includes layers 1-18, respectively: a PE material layer, a PE material layer, an adhesive resin material layer, a polyamide material layer, an EVOH material layer, a polyamide material layer, an adhesive resin material layer, a PE material layer, a ULDPE material layer, a ULDPE material layer, a PE material layer, an adhesive resin material layer, a polyamide material layer, an EVOH material layer, a polyamide material layer, an adhesive resin material layer, a PE material, and a PE material layer.

10 Claims, 20 Drawing Sheets

Related U.S. Application Data

(60) Provisional application No. 62/149,265, filed on Apr. 17, 2015.

(51) Int. Cl.

| | | |
|---|---|---|
| *B32B 27/30* | (2006.01) | |
| *B32B 3/08* | (2006.01) | |
| *B32B 3/26* | (2006.01) | |
| *B32B 7/12* | (2006.01) | |
| *B32B 27/32* | (2006.01) | |
| *B32B 27/34* | (2006.01) | |
| *B65D 77/06* | (2006.01) | |
| *B65B 55/02* | (2006.01) | |
| *B32B 27/08* | (2006.01) | |
| *B65B 55/08* | (2006.01) | |
| *B67D 3/04* | (2006.01) | |
| *B65B 55/10* | (2006.01) | |
| *B65B 9/00* | (2006.01) | |

(52) U.S. Cl.
CPC .......... *B65B 55/022* (2013.01); *B65D 77/067* (2013.01); *B32B 2250/05* (2013.01); *B32B 2307/31* (2013.01); *B32B 2307/546* (2013.01); *B32B 2307/581* (2013.01); *B32B 2307/5825* (2013.01); *B32B 2307/7244* (2013.01); *B32B 2307/7265* (2013.01); *B32B 2307/732* (2013.01); *B32B 2307/74* (2013.01); *B32B 2439/06* (2013.01); *B32B 2439/46* (2013.01); *B32B 2439/70* (2013.01); *B65B 9/00* (2013.01); *B65B 55/08* (2013.01); *B65B 55/103* (2013.01); *B67D 3/043* (2013.01); *B67D 3/045* (2013.01)

(56) References Cited

U.S. PATENT DOCUMENTS

| | | | |
|---|---|---|---|
| 3,595,445 A | | 7/1971 | Buford |
| 4,687,123 A | | 8/1987 | Hyde |
| 4,909,726 A | * | 3/1990 | Bekele .................... B32B 27/08 428/34.3 |
| 4,948,014 A | | 8/1990 | Rutter et al. |
| 5,000,359 A | | 3/1991 | Scholle et al. |
| 5,111,970 A | | 5/1992 | Rutter et al. |
| 5,397,613 A | | 3/1995 | Georgelos |
| 5,397,640 A | | 3/1995 | Georgelos et al. |
| 5,593,747 A | | 1/1997 | Georgelos |
| 5,635,261 A | | 6/1997 | Georgelos et al. |
| 5,697,410 A | | 12/1997 | Rutter et al. |
| 5,740,945 A | | 4/1998 | Shipway |
| 5,901,761 A | | 5/1999 | Rutter et al. |
| 5,928,740 A | | 7/1999 | Wilhoit et al. |
| 5,983,964 A | | 11/1999 | Zielinksi et al. |
| 6,131,767 A | | 10/2000 | Savage et al. |
| 6,200,300 B1 | | 3/2001 | Petriekis et al. |
| 6,470,910 B2 | | 10/2002 | Blackbourn et al. |
| 6,609,636 B1 | | 8/2003 | Petriekis et al. |
| 6,612,545 B1 | | 9/2003 | Rutter et al. |
| 6,648,186 B2 | | 11/2003 | Roethel |
| 6,702,337 B2 | | 3/2004 | Rutter et al. |
| 6,715,644 B2 | | 4/2004 | Wilford |
| 6,749,910 B1 | | 6/2004 | Georgelos et al. |
| 6,773,820 B1 | | 8/2004 | Wilhoit et al. |
| 6,777,046 B1 | | 8/2004 | Tatarka et al. |
| 6,777,047 B1 | | 8/2004 | Tatarka et al. |
| 6,815,023 B1 | | 11/2004 | Tatarka et al. |
| 6,893,000 B2 | | 5/2005 | Rutter et al. |
| 6,971,548 B2 | | 12/2005 | Smith |
| 7,175,903 B1 | | 2/2007 | Hopton et al. |
| 7,543,723 B2 | | 6/2009 | Wilford et al. |
| 7,721,755 B2 | | 5/2010 | Smith et al. |
| 7,726,525 B2 | | 6/2010 | Nini |
| 7,919,738 B2 | | 4/2011 | Su et al. |
| 8,113,239 B2 | | 2/2012 | Richards et al. |
| 8,336,743 B2 | | 12/2012 | Bellmore |
| D676,320 S | | 2/2013 | Richards et al. |
| 8,459,510 B2 | | 6/2013 | Richards et al. |
| 8,517,229 B2 | | 8/2013 | Nini |
| 8,602,387 B2 | | 12/2013 | Wrigley et al. |
| 8,690,026 B2 | | 4/2014 | Richards et al. |
| 8,734,710 B2 | | 5/2014 | Georgelos et al. |
| 8,753,745 B2 | | 6/2014 | Sanfilippo et al. |
| 8,757,452 B2 | | 6/2014 | Richards et al. |
| 8,944,094 B2 | | 2/2015 | Johnson |
| D724,697 S | | 3/2015 | Johnson |
| 8,978,346 B2 | | 3/2015 | Breck |
| 9,248,632 B2 | | 2/2016 | Bellmore et al. |
| 9,248,947 B2 | | 2/2016 | Georgelos et al. |
| 9,283,736 B2 | | 3/2016 | Breck |
| 9,321,549 B2 | | 4/2016 | Georgelos et al. |
| 9,394,088 B2 | | 7/2016 | Bellmore et al. |
| D766,083 S | | 9/2016 | Trettin et al. |
| 9,434,516 B2 | | 9/2016 | Johnson |
| 9,481,495 B2 | | 11/2016 | Bellmore et al. |
| 9,482,377 B2 | | 11/2016 | Johnson |
| 9,499,314 B2 | | 11/2016 | Fan et al. |
| D773,928 S | | 12/2016 | Trettin et al. |
| 9,533,477 B2 | | 1/2017 | Breck |
| 9,745,104 B2 | | 8/2017 | Sanfilippo et al. |
| 9,757,926 B2 | | 9/2017 | Breck |
| 2004/0065056 A1 | | 4/2004 | Wilford et al. |
| 2004/0151934 A1 | | 8/2004 | Schwark et al. |
| 2005/0148680 A1 | | 7/2005 | Speer |
| 2006/0099436 A1 | * | 5/2006 | Schwark .................. B32B 27/08 428/474.4 |
| 2006/0257652 A1 | | 11/2006 | Su |
| 2007/0117919 A1 | | 5/2007 | Hopton et al. |
| 2008/0131671 A1 | | 6/2008 | Chen et al. |
| 2008/0245816 A1 | | 10/2008 | Armstrong et al. |
| 2009/0061062 A1 | * | 3/2009 | Beckwith .............. B32B 27/306 426/546 |
| 2009/0078721 A1 | | 3/2009 | Hoffman |
| 2010/0129008 A1 | | 5/2010 | Bellmore et al. |
| 2010/0215925 A1 | | 8/2010 | Chen et al. |
| 2010/0282345 A1 | | 11/2010 | Richards |
| 2010/0296858 A1 | | 11/2010 | Richards et al. |
| 2011/0027428 A1 | | 2/2011 | Bekele |
| 2011/0076506 A1 | * | 3/2011 | Blok ...................... B32B 27/32 428/474.4 |
| 2011/0174842 A1 | | 7/2011 | Nini |
| 2011/0226789 A1 | | 9/2011 | Georgelos et al. |
| 2011/0309279 A1 | | 12/2011 | Richards et al. |
| 2012/0288220 A1 | | 11/2012 | Gerhard et al. |
| 2012/0318698 A1 | * | 12/2012 | Bekele ...................... B32B 7/12 206/524.1 |
| 2013/0074454 A1 | * | 3/2013 | Babrowicz ............... B32B 7/02 53/467 |
| 2013/0096521 A1 | * | 4/2013 | Bekele ...................... A61F 5/44 604/333 |
| 2013/0098947 A1 | | 4/2013 | Richards et al. |
| 2013/0270305 A1 | | 10/2013 | Richards et al. |
| 2013/0302894 A1 | * | 11/2013 | Bekele .................. C12M 23/00 435/394 |
| 2014/0076927 A1 | | 3/2014 | Brooks |
| 2014/0224836 A1 | | 8/2014 | Campanelli et al. |
| 2014/0272283 A1 | * | 9/2014 | Swenson ............... B29C 45/231 428/137 |
| 2014/0301674 A1 | | 10/2014 | Sanfilippo et al. |
| 2014/0328552 A1 | | 11/2014 | Sanfilippo et al. |
| 2014/0350135 A1 | | 11/2014 | Georgelos et al. |
| 2015/0001234 A1 | | 1/2015 | Sanfilippo et al. |
| 2015/0048111 A1 | | 2/2015 | Bellmore |
| 2015/0069094 A1 | | 3/2015 | Maher et al. |
| 2015/0336365 A1 | * | 11/2015 | Kupsch .................. B32B 27/32 428/476.9 |
| 2015/0344288 A1 | | 12/2015 | Ortega Collado |
| 2016/0046427 A1 | | 2/2016 | Bellmore et al. |
| 2016/0083161 A1 | | 3/2016 | Moriz et al. |
| 2016/0122104 A1 | | 5/2016 | Bellmore et al. |
| 2016/0230002 A1 | | 8/2016 | Georgelos et al. |
| 2017/0066641 A1 | | 3/2017 | Van Der Molen et al. |

(56) References Cited

U.S. PATENT DOCUMENTS

| | | |
|---|---|---|
| 2017/0107094 A1 | 4/2017 | Van Der Molen et al. |
| 2017/0151760 A1 | 6/2017 | Monroe et al. |
| 2017/0152088 A1 | 6/2017 | Monroe et al. |
| 2017/0190562 A1 | 7/2017 | Trettin |
| 2018/0264787 A1* | 9/2018 | Hausmann .............. B32B 27/08 |

FOREIGN PATENT DOCUMENTS

| | | |
|---|---|---|
| AU | 2011248536 | 11/2011 |
| BR | 2009PI11001 | 10/2015 |
| CA | 20142921920 | 2/2015 |
| CN | 104528135 | 4/2015 |
| CN | 20141700796 | 4/2015 |
| EP | 0213783 | 3/1987 |
| EP | 0432070 | 6/1991 |
| EP | 1600289 | 11/2005 |
| EP | 2825498 | 9/2016 |
| EP | 3119718 | 12/2017 |
| GB | 2101275 | 1/1983 |
| GB | 2140132 | 11/1984 |
| GB | 2169061 | 7/1986 |
| JP | 2001149053 | 6/2001 |
| JP | 2002321318 | 11/2002 |
| JP | 2006095832 | 4/2006 |
| JP | 3882860 | 2/2007 |
| NZ | 20100620015 | 5/2015 |
| WO | 97048614 | 12/1997 |
| WO | 02051705 | 7/2002 |
| WO | 2007095667 | 8/2007 |
| WO | 2009029350 | 3/2009 |
| WO | 2012164585 | 12/2012 |
| WO | 2015026694 | 2/2015 |
| WO | 2015179614 | 11/2015 |

OTHER PUBLICATIONS

Patent Cooperation Treaty, Notification of Transmittal of the International Search Report and the Written Opinion of the International Searching Authority, or the Declaration, Application No. PCT/IB2016/000909, dated Sep. 30, 2016 (16 pages).

Performance dispensing for all types of packaging, Push Taps—DS Smith Plastics, extracted from Internet Archive from Mar. 2015, https://web.archive.org/web/20141223152744/http://www.dssmith.com:80/worldwide-dispensers/offering/in-stock-solutions/push-taps.

Goode, Finding Closure, Wines & Vines, Aug. 2008, https://www.winesandvines.com/template.cfm?content=57269&section=features.

U.S. Appl. No. 62/002,377, filed May 23, 2014.

* cited by examiner

MULTILAYER FILM USED WITH FLEXIBLE PACKAGING

RELATED APPLICATIONS

The present application is a Continuation application claiming the benefit of, and priority to, U.S. patent application Ser. No. 15/097,504 filed on Apr. 13, 2016, titled "Multilayer Film Used With Flexible Packaging," which is an application claiming the benefit of, and priority to, U.S. Provisional Application No. 62/149,265, filed Apr. 17, 2015, titled "Multilayer Film Used With Flexible Packaging." The complete subject matter and contents of application Ser. No. 15/097,504 and App. Ser. No. 62/149,265 are incorporated herein by reference in their entireties.

FIELD OF THE INVENTION

The present invention relates to a multilayer film used with packaging, and in particular a multilayer film used as a flexible liner connected to a tap as part of packaging for liquids.

BACKGROUND OF THE INVENTION

Liquid beverages, such as wine, are often sold in bag-in-a-box packaging that includes a flexible bag or liner positioned in a box and connected to a tap or faucet that extends out of the box. The liquid is stored in the bag and a user dispenses the liquid from the packaging by activating the tap. Some liquid beverages, such as wine, that are stored and sold in a bag-in-a-box packaging system are highly oxygen sensitive. That is, exposure to oxygen can cause the wine to spoil and therefore affect the shelf life of the wine. The bags for such packaging systems are typically made from a film of ethylene vinyl alcohol ("EVOH").

Wine manufacturers add sulfites to packaged wine that act as a preservative to prevent spoilage and oxidation of the wine. While EVOH-based films provide a barrier to oxygen transfer, the EVOH films from which the liner bags are made do not completely prevent oxygen from seeping into the bag over time. That is, oxygen can enter the bag through the film of the bag from the outside environment at a given oxygen transmission rate ("OTR"). Typical wine bag films have an OTR of 0.05 cc/100 in$^2$/day at 73 degrees Fahrenheit and 0% relative humidity. As oxygen enters the bag from the external environment, the oxygen uses up the sulfite preservatives in the bag and can then react or oxidize the wine, which spoils it. Oxygen can also enter the bag through the tap to which the bag is connected. Moreover, oxygen may be located in the headspace of the bag after the bag is filled with wine and sealed during the packaging process, and oxygen can also escape from the wine itself over time and fill the headspace in the bag. Consequently, wine stored with sulfites in a sealed flexible bag still can spoil due to exposure to oxygen over time and, thus, has a limited shelf life.

More sulfites can be added to the wine during the packaging process to help prevent oxidation and extend the shelf life of the wine, but too many sulfites can negatively affect the taste of the wine. In addition, oxygen in the headspace of the bag can be replaced with an inert gas like nitrogen during the packaging process, but replacing oxygen in the headspace with an inert gas does not prevent the ingress of oxygen into the bag from the outside environment.

SUMMARY OF THE INVENTION

Certain aspects of the present technology provide a multilayer film for use in making a bag for bag in a box packaging. The film includes a first layer made of a PE material, a second layer adjacent the first layer made of a PE material and further including an oxygen scavenger, a third layer adjacent the second layer made of an adhesive resin material, a fourth layer adjacent the third layer made of a polyamide material, a fifth layer adjacent the fourth layer made of an EVOH material, a sixth layer adjacent the fifth layer made of a polyamide material, a seventh layer adjacent the sixth layer made of an adhesive resin material, an eighth layer adjacent the seventh layer made of a PE material, and a ninth layer adjacent the eighth layer made of a PE material.

In some embodiments, the first layer is a sealant layer that contacts liquid in the packaging, the oxygen scavenger is an iron oxide oxygen scavenger, and/or the fourth and sixth layers include nylon. In some embodiments, the fifth layer has a 27 mole percent ethylene content. In addition, the pouch may have a thickness in the range of 35 to 150 microns. Further, the film may have an oxygen transfer rate of no more than 0.006 cc/100 in$^2$/24 hours at 0% relative humidity.

Certain aspects of the present technology provide a multilayer film for use in making a bag for bag in a box packaging. The film includes a first layer made of a PE material, a second layer adjacent the first layer made of a PE material, a third layer adjacent the second layer made of an adhesive resin material, a fourth layer adjacent the third layer made of a polyamide material, a fifth layer adjacent the fourth layer made of an EVOH material, a sixth layer adjacent the fifth layer made of a polyamide material, a seventh layer adjacent the sixth layer made of an adhesive resin material, an eighth layer adjacent the seventh layer made of a PE material, a ninth layer adjacent the eighth layer made of a ULDPE material, a tenth layer adjacent the ninth layer made of a ULDPE material, an eleventh layer adjacent the tenth layer made of a PE material, a twelfth layer adjacent the eleventh layer made of an adhesive resin material, a thirteenth layer adjacent the twelfth layer made of a polyamide material, a fourteenth layer adjacent the thirteenth layer made of an EVOH material, a fifteenth layer adjacent the fourteenth layer made of a polyamide material, a sixteenth layer adjacent the fifteenth layer made of an adhesive resin material, a seventeenth layer adjacent the sixteenth layer made of a PE material, and an eighteenth layer adjacent the seventeenth layer made of a PE material.

In some embodiments, the first layer is a sealant layer that contacts liquid in the packaging, the second layer further includes an oxygen scavenger, and/or the fourth, sixth, thirteenth, and fifteenth layers include nylon. In some embodiments, the fifth and fourteenth layers have a mole percent ethylene content of 29%, and in some embodiments the fifth and fourteenth layers have a mole percent ethylene content of 27%. In addition, the film may be used to make a sealed pouch having an aperture to which is connected a spout, and the spout is connected to a fluid dispenser. The pouch may have a thickness in the range of 35 to 150 microns. Further, the film may have an oxygen transfer rate of no more than 0.003 cc/100 in$^2$/24 hours at 0% relative humidity.

Certain aspects of the present technology include packaging for a liquid beverage. The packaging includes a fluid dispenser having a flow configuration and a sealed configuration. The fluid dispenser may include a main body having an outer flow surface and an inner flow surface, the outer flow surface having an opening therethrough defining a dispensing port. The fluid dispenser may further include a dome member and a valve member having a face and being coupled to the dome member. The packaging also includes a pouch defining an interior region and including an aperture. The pouch is made of a film including a first layer made of a PE material, a second layer adjacent the first layer made of a PE material and including an oxygen scavenger, a third layer adjacent the second layer made of an adhesive resin material, a fourth layer adjacent the third layer made of a polyamide material, a fifth layer adjacent the fourth layer made of an EVOH material, a sixth layer adjacent the fifth layer made of a polyamide material, a seventh layer adjacent the sixth layer made of an adhesive resin material, an eighth layer adjacent the seventh layer made of a PE material, and a ninth layer adjacent the eighth layer made of a PE material. The packaging further includes a spout connected to the pouch at the aperture, and the fluid dispenser is connected to the spout such that the fluid dispenser is in fluid communication with the interior region of the pouch. When the fluid dispenser is in the flow configuration, the outer flow surface, inner flow surface, and face define a fluid passageway for fluid to flow exteriorly to the inner flow surface, interiorly to the outer flow surface, and exit the fluid dispenser via the dispensing port.

In some embodiments, the packaging also includes a container, wherein the container includes an aperture, and the pouch is positioned inside the container, and the fluid dispenser is secured in the aperture in the container and extends at least partly outside of the container.

Certain aspects of the present technology provide a multilayer film for use in making a bag for bag in a box packaging. The film includes a first layer made of a PE material, a second layer adjacent the first layer made of a PE material and further including an oxygen scavenger, a third layer adjacent the second layer made of an adhesive resin material, a fourth layer adjacent the third layer made of an EVOH material, a fifth layer adjacent the fourth layer made of an adhesive resin material, a sixth layer adjacent the fifth layer made of a polyethylene material, and a seventh layer adjacent the sixth layer made of a polyethylene material.

DETAILED DESCRIPTION OF THE INVENTION

Figure 1:
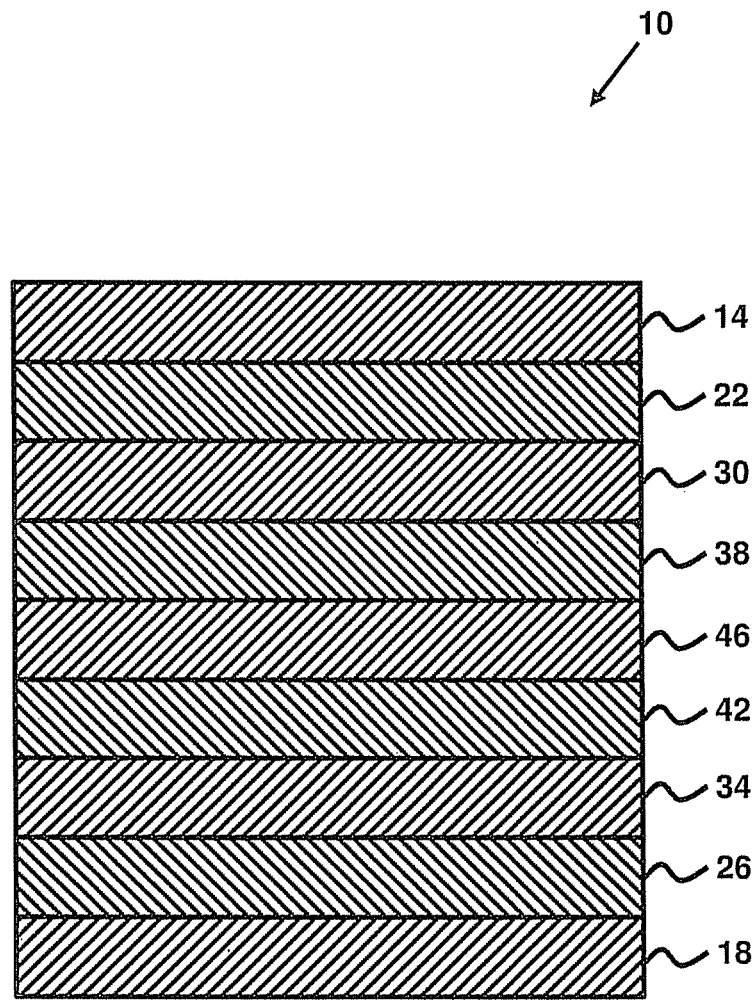
FIG. 1 is a cross-sectional side view of a multilayer film according to an embodiment of the present invention.

The present invention relates to a film for use in a bag or liner that is part of a bag-in-a-box packaging system. The bag is made of multilayered polymeric sheets of film. The bag contains liquids, and, in particular, wine. FIG. 1 shows a cross-sectional side view of a multilayer film 10 that is used to make the bag. In particular, the film 10 includes nine layers.

Layers 14 and 18 may be made of polyethylene ("PE"). In particular, and by way of example, layers 14 and 18 may be made of linear low-density polyethylene ("LLDPE"). Dow Dowlex 2045 or Nova Chemicals FP120C are two examples of suitable LLDPEs. Furthermore, and alternatively, the layers 14 and 18 can be composed of m-LLDPE (metallocene catalyzed LLDPE such as ExxonMobil's Exceed resins or Dow Chemical's Elite resins), m-PE (metallocene catalyzed polyethylene with densities below 0.915 cc/g such as ExxonMobil's Exact resins or Dow Chemical's Affinity resins), EVAs (Ethylene Vinyl Acetate copolymers like DuPont's Elvax resins), ionomers like DuPont's Surlyn resins, LDPE (Low Density Polyethylene), HDPE (High Density Polyethylene), or PP (Polypropylene) or ethylene propylene copolymers like Dow's Versify resins or combinations of the aforementioned polymers. The choice of polymer type depends on the properties required in the bag.

Layer 18 is the first layer, or innermost sealant layer. Layer 18 is in contact with the liquid contents of the bag. Layer 14 is the ninth, or outermost, layer of the film 10, and is in contact with the environment outside of the bag.

Layer 22 is the eighth layer and is adjacent and inside of the outer layer 14. Layer 22 may also be made of PE, and, more particularly and by way of example, LLDPE. Layer 26 is the second layer and is adjacent and inside of the inner layer 18. Layer 26 may also be made of PE, and, more particularly and by way of example, LLDPE. Layers 22 and 26 may be made of Dow Dowlex 2045 or Nova Chemical Sclair FP120C. Furthermore, and alternatively, the layers 22 and 26 can be composed of m-LLDPE (metallocene catalyzed LLDPE such as ExxonMobil's Exceed resins or Dow Chemical's Elite resins), m-PE (metallocene catalyzed PE with densities below 0.915 cc/g such as ExxonMobil's Exact resins or Dow Chemical's Affinity resins), EVAs (Ethylene Vinyl Acetate copolymers like DuPont's Elvax resins), ionomers like DuPont's Surlyn resins, LDPE, HDPE or PP or ethylene propylene copolymers like Dow's Versify resins or combinations of the aforementioned polymers. The choice of polymer type depends on the properties required in the bag. Layer 26 also includes an oxygen scavenger or absorber. By way of example only, the oxygen scavenger is an iron oxide oxygen scavenger. However, any number of other kinds of oxygen scavengers can be used. An example of a suitable oxygen scavenger is Albis Plastic GmbH Shelfplus O2 technology.

Layers 30 and 34 are the seventh and third layers, respectively. Layer 30 is adjacent and inside of layer 22, and layer 34 is adjacent and inside of layer 26. Layers 30 and 34 are adhesive resin or tie layers. In particular, and by way of example, layers 30 and 34 may be made of maleic anhydride grafted polyolefin polymers such as Equistar's Plexar 3236 or Dupont Bynel 4104.

Layers 38 and 42 are the sixth and fourth layers, respectively. Layer 38 is adjacent and inside of layer 30, and layer 42 is adjacent and inside of layer 34. Layers 38 and 42 are polyamide ("PA") layers. In particular, and by way of example, layers 38 and 42 may be made of nylon 6, nylon 6,6, nylon 6,66, nylon 11, or nylon 12. An example of a suitable nylon 6 is Honeywell's Aegis H85QP, and an example of a suitable nylon 6,66 is BASF's Ultramid C33L01.

Central layer 46 is between and adjacent to layers 38 and 42 and is an EVOH layer. By way of example only, the EVOH copolymer has a 27 mole percent ethylene content. In particular, and by way of example, layer 46 may be made of Kuraray's EVAL L171. Alternatively, a suitable EVOH to use is a 29 mol percent ethylene grade from Soarus called Soarnol D2908.

Figure 3:
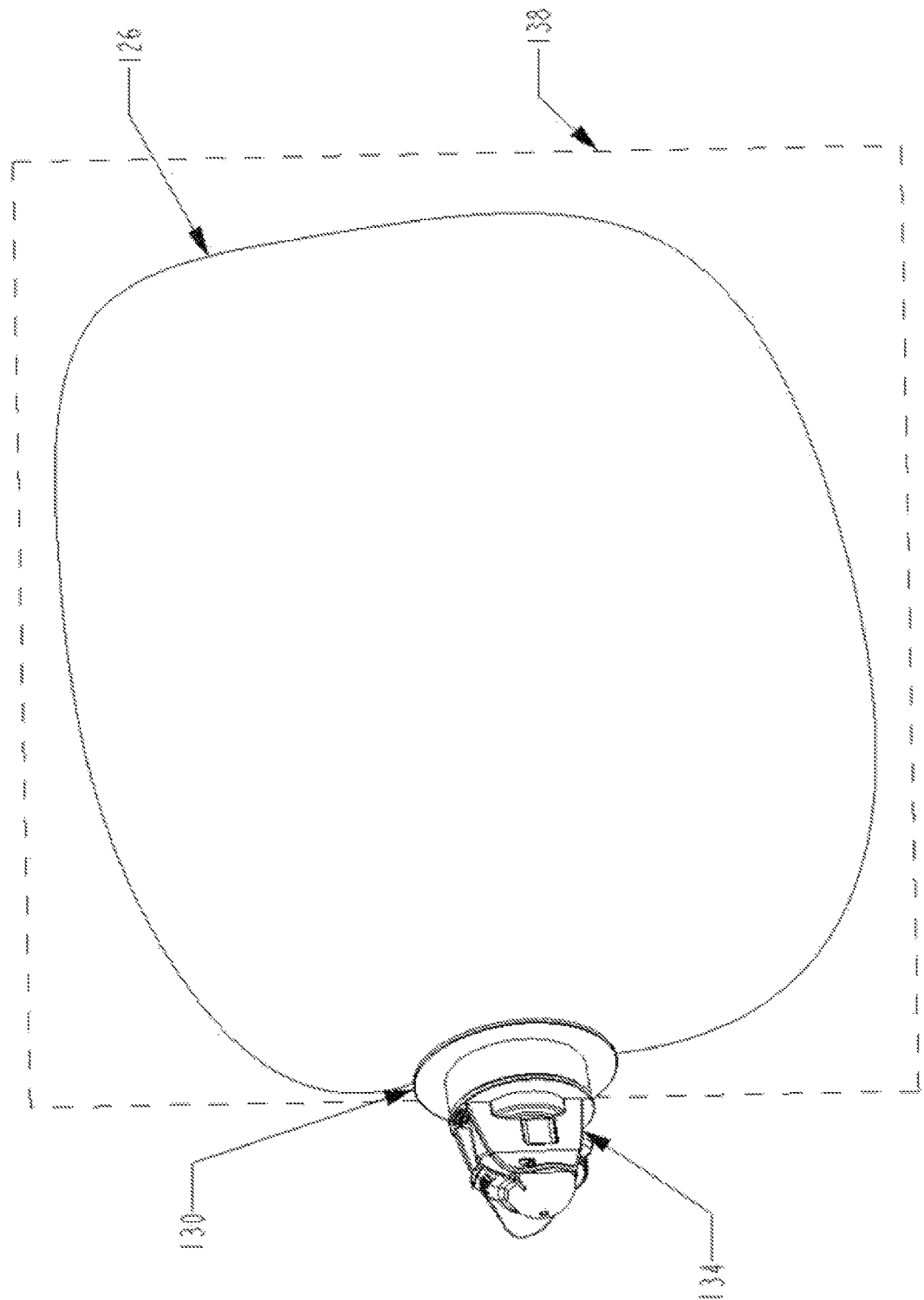
FIG. 3 is an isometric view of a bag in box packaging system according to an embodiment of the present invention.

The multilayer film 10 may be made by any suitable method for producing multi-layer polyethylene films, including blown or cast extrusions or co-extrusions or laminating processes known in the art. One blown film extrusion method is disclosed in U.S. Pat. No. 8,734,710, which is incorporated herein by reference. With respect to FIG. 3, the film 10 is used to create a sealed pouch or bag 126 with an aperture, and a fitment or spout 130 is attached or sealed to the bag 126 and aligned with the aperture. The pouches manufactured using the films of the invention may range in volume from generally 500 ml to 50 liters.

During the packaging process, the bag 126 is filled with a beverage liquid, such as wine, through the spout 130. The wine may contain sulfites. Once the bag 126 is filled with wine, the spout 130 of the bag 126 is connected to a tap 134. The bag 126 is then placed in a container 138 such as a corrugated box, and the tap 134 is inserted through an aperture in the side of the box 138 such that the dispenser of the tap 134 is located outside of the box 138 and the tap 134 is securely mounted to the box 138. The tap 134 includes an adapter or coupler 224 (FIG. 4) that is connected and secured to the fitment or spout 130 on the bag 126. In particular, the tap 134 may be one like those described in U.S. Pat. App. Ser. No. 62/002,377, which was filed on May 23, 2014, and PCT/US2015/31926, published as WO 2015179614, which was filed on May 21, 2015. The entirety of U.S. Pat. App. Ser. No. 62/002,377 and PCT/US2015/31926 is incorporated herein by reference. Furthermore, the taps disclosed in those applications are discussed in greater detail below.

In operation, the bag 126 made of the film 10 forms an active barrier to help reduce oxidation and OTR into the bag 126 after the bag 126 has been filled with the wine. First, the film 10 having the nine layer structure and properties described above creates an improved high barrier to OTR and thus helps limit the amount of oxygen that can ingress into the bag through the film. In addition, the oxygen scavenger in layer 26 of the film 10 absorbs oxygen that is located in the headspace of the bag 126 after the packaging process and oxygen that may escape from the wine. The oxygen scavenger also absorbs oxygen that may pass through the barrier created by the film 10 of the bag 126 or that passes into the bag 126 through the tap 134. However, because the oxygen scavenger is located in the layer 26, which is adjacent to the first, or sealant, layer 18, the oxygen scavenger does not come into contact with the wine contents of the bag 126 and, therefore, does not affect the taste of the wine.

Figure 2:
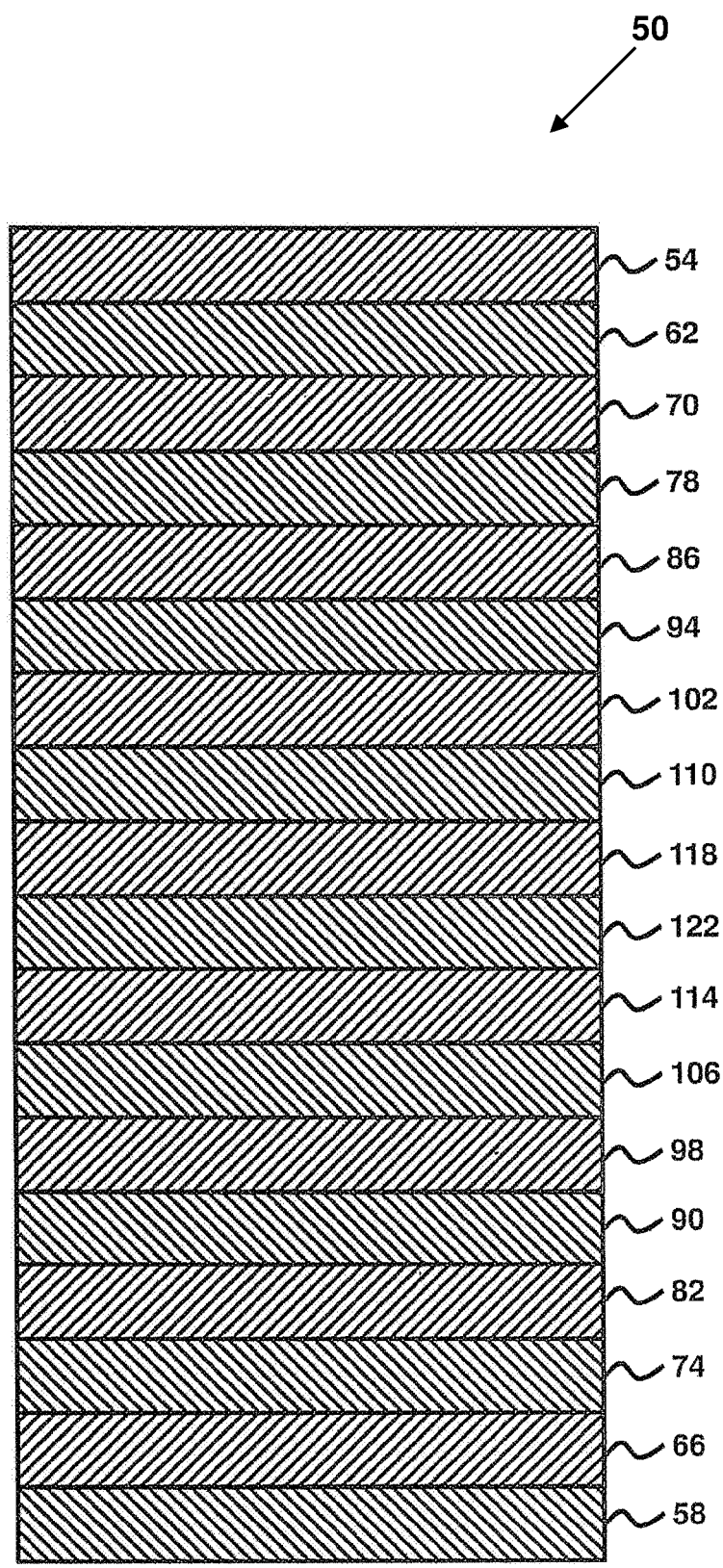
FIG. 2 is a cross-sectional side view of a multilayer film according to an embodiment of the present invention.

FIG. 2 shows a cross-sectional side view of another embodiment of a multilayer film 50 that is used to make the bag 126. The film 50 has 18 layers. Layers 54 and 58 may be made of PE, and, in particular, LLDPE+m-LLDPE. By way of example, layers 54 and 58 may be made of Nova Chemicals Sclair FP-120C and Exxon Mobil Exceed 1018 CA. Furthermore, and alternatively, the layers 54 and 58 can be composed of m-LLDPE (metallocene catalyzed LLDPE such as ExxonMobil's Exceed resins or Dow Chemical's Elite resins), m-PE (metallocene catalyzed PE with densities below 0.915 cc/g such as ExxonMobil's Exact resins or Dow Chemical's Affinity resins), EVAs (Ethylene Vinyl Acetate copolymers like DuPont's Elvax resins), ionomers like DuPont's Surlyn resins, LDPE, HDPE or PP or ethylene propylene copolymers like Dow's Versify resins or combinations of the aforementioned polymers. The choice of polymer type depends on the properties required in the bag. Layer 58 is the first layer, or innermost sealant layer, and is in contact with the liquid contents of the bag. Layer 54 is the eighteenth, or outermost, layer of the film 10, and is in contact with the environment outside of the bag.

Layer 62 is the seventeenth layer and is adjacent and inside of outer layer 54. Layer 62 is made of PE, and in particular may be made of LLDPE, and may include an oxygen scavenger. Layer 66 is the second layer and is adjacent and inside of the inner layer 58. Layer 66 may also be made of PE, and in particular may be made of LLDPE, and may include an oxygen scavenger. In particular, and by way of example, layers 62 and 66 may be made of Nova Chemical Sclair FP120C. Furthermore, the polyethylene layers can be composed of m-LLDPE (metallocene catalyzed LLDPE such as ExxonMobil's Exceed resins or Dow Chemical's Elite resins), m-PE (metallocene catalyzed PE with densities below 0.915 cc/g such as ExxonMobil's Exact resins or Dow Chemical's Affinity resins), EVAs (Ethylene Vinyl Acetate copolymers like DuPont's Elvax resins), ionomers, LDPE, HDPE or PP or combinations of the aforementioned polymers.

Layers 70 and 74 are the sixteenth and third layers, respectively. Layer 70 is adjacent and inside of layer 62, and layer 74 is adjacent and inside of layer 66. Layers 70 and 74 are adhesive resin or tie layers. In particular, and by way of example, layers 70 and 74 may be made of maleic anhydride grafted polyolefin polymers such as Equistar's Plexar 3236 or Dupont Bynel 4104.

Layers 78 and 82 are the fifteenth and fourth layers, respectively. Layer 78 is adjacent and inside of layer 70, and layer 82 is adjacent and inside of layer 74. Layers 78 and 82 are polyamide layers. In particular, and by way of example, layers 78 and 82 may be made of nylon 6, nylon 6,6, nylon 6,66, nylon 11, or nylon 12. By way of example, layers 78 and 82 may be made of BASF Ultramid 40L or Honeywell Aegis H85QP.

Layers 86 and 90 are the fourteenth and fifth layers, respectively. Layer 86 is adjacent and inside of layer 78, and layer 90 is adjacent and inside of layer 82. Layers 86 and 90 are EVOH layers. By way of example only, the EVOH copolymer has a 27 or 29 mole percent ethylene content. In particular, and by way of example, layers 86 and 90 may be made of Kuraray EVAL L171 or Soarus Soarnol D2908.

Layers 94 and 98 are the thirteenth and sixth layers, respectively. Layer 94 is adjacent and inside of layer 86, and layer 98 is adjacent and inside of layer 90. Layers 94 and 98 are polyamide layers. In particular, and by way of example, layers 78 and 82 may be made of nylon 6, nylon 6,6, nylon 6,66, nylon 11, or nylon 12. By way of example, layers 94 and 98 may be made of Honeywell Aegis H85QP or BASF Ultramid C33L01.

Layers 102 and 106 are the twelfth and seventh layers, respectively. Layer 102 is adjacent and inside of layer 94, and layer 106 is adjacent and inside of layer 98. Layers 102 and 106 are adhesive resin or tie layers. In particular, and by way of example, layers 102 and 106 may be made of maleic anhydride grafted polyolefin polymers such as Equistar Plexar 3236.

Layers 110 and 114 are the eleventh and eighth layers, respectively. Layer 110 is adjacent and inside of layer 102, and layer 114 is adjacent and inside of layer 106. Layers 110 and 114 may be made of PE, and in particular may be made of LLDPE layers. By way of example, layers 110 and 114 may be made of Nova Chemical Sclair FP120C. Furthermore, and alternatively, the layers 110 and 114 can be composed of m-LLDPE (metallocene catalyzed LLDPE such as ExxonMobil's Exceed resins or Dow Chemical's Elite resins), m-PE (metallocene catalyzed PE with densities below 0.915 cc/g such as ExxonMobil's Exact resins or Dow Chemical's Affinity resins), EVAs (Ethylene Vinyl Acetate copolymers like DuPont's Elvax resins), ionomers, LDPE, HDPE or PP or combinations of the aforementioned polymers.

Layers 118 and 122 are the tenth and ninth layers, respectively. Layer 118 is adjacent and inside of layer 110, and layer 122 is adjacent and inside of layer 114. Layers 118 and 122 are ultra low density polyethylene ("ULDPE") layers. In particular, and by way of example, layers 118 and 122 may be made of Dow Chemical Attane 4201. Alternatively, layers 118 and 122 may made of an EVA copolymer such as Dupont Elvax 3165 or a metallocene PE such as Exxon Mobil Exact 3132.

The multilayer film 50 may be made by any suitable method for producing multi-layer polyethylene films, including blown or cast extrusions or co-extrusions or laminating processes known in the art. The film 50 may be used to make the bag 126 shown in FIG. 3 the same way film 10 is. In operation, the bag 126 made of the film 50 forms a barrier to help reduce oxidation and OTR into the bag 126. The film 50 having the 18-layer structure and properties described above creates an improved high barrier to OTR and thus helps limit the amount of oxygen that can ingress into the bag 126 through the film 50. In addition, the oxygen scavenger that may be used in layers 62 and 66 of the film 50 absorbs oxygen that is located in the headspace of the bag 126 after the packaging process and oxygen that may escape from the wine. The oxygen scavengers also absorb oxygen that may pass through the barrier created by the film 50 of the bag 126 or that passes into the bag 126 through the tap 134. However, because the oxygen scavengers are located in the layers 62 and 66, the oxygen scavengers do not come into contact with the wine contents of the bag 126 and, therefore, does not affect the taste of the wine The film 10 may have a thickness of from about 35 to about 150 microns, and the film 50 may have a thickness of from about 35 to about 150 microns. Alternatively, each of the films 10 and 50 may be incorporated into a multi-ply bag structure, where it functions as the sealant layer.

Additionally, in other embodiments, the film used to make the bag 126 may have seven layers. A first example of such a seven layer film may have a first, or sealant layer, made of polyethylene (such as any of the examples of polyethylene referenced above). The film may include a second layer made of polyethylene (such as any of the examples of polyethylene referenced above) and an oxygen scavenger, wherein the concentration of the oxygen scavenger in the second layer is ≥6.0%. The film may include a third layer made of an adhesive resin or tie layer (such as any of the adhesive resin or tie layers referenced above), a fourth layer made of EVOH (such as any the examples of EVOHs referenced above), a fifth layer made of an adhesive resin or tie layer (such as any of the adhesive resin or tie layers referenced above), a sixth layer made of polyethylene (such as any of the examples of polyethylene referenced above), and a seventh, or outer layer, made of polyethylene (such as any of the examples of polyethylene referenced above).

A second example of a seven layer film may have a first, or sealant layer, made of polyethylene, and, in particular an m-PE (such as any of the examples of polyethylene or m-PE referenced above). The second example of a seven layer film may also include a second layer made of polyethylene (such as any of the examples of polyethylene referenced above) and an oxygen scavenger wherein the concentration of the oxygen scavenger in the second layer is at least twice that of the oxygen scavenger in the second layer of the first example of a seven layer film. That is, the concentration of the oxygen scavenger in the second layer may be ≥12.0%. The second example of a seven layer film may further include a third layer made of an adhesive resin or tie layer (such as any of the adhesive resin or tie layers referenced above), a fourth layer made of EVOH (such as any the examples of EVOHs referenced above), a fifth layer made of an adhesive resin or tie layer (such as any of the adhesive resin or tie layers referenced above), a sixth layer made of polyethylene (such as any of the examples of polyethylene referenced above), and a seventh, or outer layer, made of polyethylene (such as any of the examples of polyethylene referenced above).

The pouch or bag 126 may be manufactured in accordance with known packaging techniques. It may be made using vertical or horizontal form, fill and seal processes which are referred to by the acronyms VFFS and HFFS, respectively. The bag 126 may be pre-made and then filled through a fitment. The bag 126 may be radiation sterilized in a batch process or via chemical means such as ethylene oxide sterilization by the bag manufacturer. The packaging conditions may include those for aseptic packaging.

The table below shows test results of film samples made in accordance with the embodiments described above. The films were tested for OTR at various relative humidity ("RH") percentages and for cracking, or pinholes, from machine direction ("MD") and circumferential ("CD") testing, which is also described in the art as TD or transverse direction testing. Film Sample 1 is a conventional EVOH-based film. Film Sample 2 is an 18 layer film like film 50 above wherein the EVOH copolymer layers 86 and 90 are sandwiched between layers of nylon (layers 78 and 94 and layers 82 and 98, respectively) and have a 29 mole percent ethylene content. Film Sample 3 is a 9 layer film like film 10 above wherein the internal layer 26 includes an oxygen scavenger and the central layer 46 has a 27 mole percent ethylene content. Film Sample 4 is an 18 layer film like film 50 above wherein the EVOH copolymer layers 86 and 90 are sandwiched between layers of nylon (layers 78 and 94 and layers 82 and 98, respectively) and have a 27 mole percent ethylene content. Film Sample 5 is an 18 layer film like film 50 above wherein the EVOH copolymer layers 86 and 90 have a 29 mole percent ethylene content.

| | | Units for OTR: cc/100 in²/24 Hrs | | | Flex Cracking | |
|---|---|---|---|---|---|---|
| | | OTR | OTR | OTR | 10,000 Cycles | |
| Film Sample | EVOH [mol %] | at 0% RH | at 50% RH | at 85% RH | Film Direction | Total Pinholes |
| 1 | Standard | 0.018 | | | MD | 18 |
| | | | | | CD | 8 |
| 2 | 29% | 0.003 | 0.012 | 0.29 | MD | 6 |
| | | | | | CD | 11 |
| 3 | 27% + O₂S | 0.006 | | | MD | 27 |
| | | | | | CD | 33 |
| 4 | 27% | 0.002 | 0.008 | 0.28 | MD | 4 |
| | | | | | CD | 4 |
| 5 | 29% | 0.002 | 0.011 | 0.3 | MD | 0 |
| | | | | | CD | 2 |

As the table shows, Film Samples 2-5 provide a significantly higher barrier to OTR than the standard Film Sample 1 used with wine bag packaging. Moreover, Film Samples 2, 4, and 5 had better results in the flex cracking testing than the standard Film Sample 1. Therefore, wine bags or pouches made of the Film Samples 2-5 provide better protection against oxidation of wine while at the same time providing sturdy packaging that will not easily tear or puncture. Moreover, bags fabricated from the film samples made in accordance with embodiments of the present invention can be used with the tap disclosed in U.S. Pat. App. Ser. No. 62/002,377 and PCT/US2015/31926. That tap has an OTR of 0.03 cc/package/day. Therefore, combining the tap with a bag made from a film of the present invention results in a packaging system that is effective in limiting the transfer of oxygen into the packaging.

More detailed test results for each of Film Samples 2-5 are reproduced below. Test results for Film Samples 6-7 are also reproduced below. Film Sample 6 is a seven layer film like the first example of a seven layer film discussed above. Film Sample 7 is a seven layer film like second example of a seven layer film discussed above. The test results include properties like film thickness, yield, dart impact, tensile strength (machine direction and transverse direction), elongation, tear strength, coefficients of friction, puncture force, haze, OTR, and seal strength. The test results also include the ASTM standards for the tests.

Film Sample 2: Nylon-EVOH—High Strength, Ultra High Barrier Nylon/EVOH Coextrusion

| Film Properties | ASTM | Units | Typical Values |
|---|---|---|---|
| Thickness | | mils | 3.6 |
| Yield | | in²/lb | 8100 |
| Dart Impact | D-1709 | grams | 1200 |
| Tensile Strength | | | |
| MD | D-882A | psi | 5300 |
| TD | | psi | 5700 |
| Elongation | | | |
| MD | D-882A | % | 375 |
| TD | | % | 575 |
| Elmendorf Tear | | | |
| MD | D-1922 | grams | >3200 |
| TD | | grams | >3200 |
| Coefficient of Friction | | | |
| Inside to Inside | D-1894 | | 0.20 |
| Outside to Outside | | | 0.20 |
| Puncture | WFI Method | lb-F | 8 |
| Haze | D-1003 | % | 13 |
| Oxygen Transmission | | | |
| 73° F. @ 0% R.H. Oxygen Transmission | D-3985 | cc/100 in²/24 hr. | 0.003 |
| 73° F. @ 50% R.H. Seal Strength | D-3985 | cc/100 in²/24 hr. | 0.012 |
| (320° F., 1 sec dwell, 40 psi) | F-88 | lb-F/in | 9 |

Structure:
PE/PA/EVOH/PA/PE//PE/PA/EVOH/PA/PE
29 mol % EVOH
Flex Cracking Results:
10,000 Cycle Test; Passing Result is <50 Pinholes per Test
Pinholes Machine Direction: 5
Pinholes Cross Direction: 11

Film Sample 3: Nylon-EVOH—High Strength, Ultra High Barrier Nylon/EVOH Coextrusion with a Built-in Oxygen Scavenger

| Film Properties | ASTM | Units | Typical Values |
|---|---|---|---|
| Thickness | | mils | 3.5 |
| Yield | | in²/lb | 7500 |
| Dart Impact | D-1709 | grams | 150 |
| Tensile Strength | | | |
| MD | D-882A | psi | 5400 |
| TD | | psi | 5800 |
| Elongation | | | |
| MD | D-882A | % | 375 |
| TD | | % | 600 |
| Elmendorf Tear | | | |
| MD | D-1922 | grams | 150 |
| TD | | grams | 300 |
| Coefficient of Friction | | | |
| Inside to Inside | D-1894 | | 0.30 |
| Outside to Outside | | | 0.15 |
| Puncture | WFI Method | Lb-F | 9 |
| Haze | D-1003 | % | N/A Gray |
| Oxygen Transmission | | | |
| 73° F. @ 0% R.H. Oxygen Transmission | D-3985 | cc/100 in²/24 hr. | 0.006 |
| 73° F. @ 50% R.H. Seal Strength | D-3985 | cc/100 in²/24 hr. | N/A |
| (320° F., 1 sec dwell, 40 psi) | F-88 | Lb-F/in | 15 |

Structure:
PE/PA/EVOH/PA/PE with Oxygen Scavenger
29 mol % EVOH
Flex Cracking Results:
10,000 Cycle Test; Passing Result is <50 Pinholes per Test
Pinholes Machine Direction: 27
Pinholes Cross Direction: 33

Film Sample 4: Nylon-EVOH—High Strength, Ultra High Barrier Nylon/EVOH Coextrusion

| Film Properties | ASTM | Units | Typical Values |
|---|---|---|---|
| Thickness | | mils | 3.5 |
| Yield | | in$^2$/lb | 8100 |
| Dart Impact | D-1709 | grams | 100 |
| Tensile Strength | | | |
| MD | D-882A | psi | 5400 |
| TD | | psi | 5800 |
| Elongation | | | |
| MD | D-882A | % | 375 |
| TD | | % | 600 |
| Elmendorf Tear | | | |
| MD | D-1922 | grams | >3200 |
| TD | | grams | >3200 |
| Coefficient of Friction | | | |
| Inside to Inside | D-1894 | | 0.15 |
| Outside to Outside | | | 0.15 |
| Puncture | WFI Method | lb-F | 7 |
| Haze | D-1003 | % | 15 |
| Oxygen Transmission | | | |
| 73° F. @ 0% R.H. | D-3985 | cc/100 in$^2$/24 hr. | 0.002 |
| Oxygen Transmission | | | |
| 73° F. @ 50% R.H. | D-3985 | cc/100 in$^2$/24 hr. | 0.008 |
| Seal Strength | | | |
| (320° F., 1 sec dwell, 40 psi) | F-88 | lb-F/in | 9 |

Structure:
  PE/PA/EVOH/PA/PE//PE/PA/EVOH/PA/PE
  27 mol % EVOH
Flex Cracking Results:
  10,000 Cycle Test; Passing Result is <50 Pinholes per Test
  Pinholes Machine Direction: 4
  Pinholes Cross Direction: 4
Film Sample 5: EVOH Only—Ultra High Barrier EVOH Coextrusion

| Film Properties | ASTM | Units | Typical Values |
|---|---|---|---|
| Thickness | | mils | 3.5 |
| Yield | | in$^2$/lb | 8300 |
| Dart Impact | D-1709 | grams | 600 |
| Tensile Strength | | | |
| MD | D-882A | psi | 4800 |
| TD | | psi | 4900 |
| Elongation | | | |
| MD | D-882A | % | 700 |
| TD | | % | 725 |
| Elmendorf Tear | | | |
| MD | D-1922 | grams | >3200 |
| TD | | grams | 300 |
| Coefficient of Friction | | | |
| Inside to Inside | D-1894 | | 0.20 |
| Outside to Outside | | | 0.15 |
| Puncture | WFI Method | lb-F | 6 |
| Haze | D-1003 | % | 14 |
| Oxygen Transmission | | | |
| 73° F. @ 0% R.H. | D-3985 | cc/100 in$^2$/24 hr. | 0.002 |
| Oxygen Transmission | | | |
| 73° F. @ 50% R.H. | D-3985 | cc/100 in$^2$/24 hr. | 0.011 |
| Seal Strength | | | |
| (320° F., 1 sec dwell, 40 psi) | F-88 | lb-F/in | 10 |

Structure:
  PE/EVOH/PE//PE/EVOH/PE
  29 mol % EVOH
Flex Cracking Results:
  10,000 Cycle Test; Passing Result is <50 Pinholes per Test
  Pinholes Machine Direction: 0
  Pinholes Cross Direction: 2
Costing
  13.3% increase from current film
Film Sample 6: EVOH Only—7 Layer EVOH Coextrusion With Oxygen Scavenger

| Film Properties | ASTM | Units | Typical Values |
|---|---|---|---|
| Thickness | | mils | 3.6 |
| Yield | | in$^2$/lb | 8200 |
| Dart Impact | D-1709 | grams | 424 |
| Tensile Strength | | | |
| MD | D-882A | psi | 4530 |
| TD | | psi | 4200 |
| Elongation at Break | | | |
| MD | D-882A | % | 175 |
| TD | | % | 155 |
| Elmendorf Tear | | | |
| MD | D-1922 | grams | 405 |
| TD | | grams | 250 |
| Coefficient of Friction | | | |
| Inside to Inside | D-1894 | | 0.18 |
| Outside to Outside | | | 0.17 |
| Puncture | D-5748 | lb-in | 23 |
| Oxygen Transmission | | | |
| 73° F. @ 0% RH | D-3985 | cc/100 in$^2$/24 hr. | 0.016 |
| Oxygen Transmission | | | |
| 73° F. @ 50% RH | D-3985 | cc/100 in$^2$/24 hr. | 0.017 |
| Oxygen Transmission | | | |
| 73° F. @ 85% RH | D-3985 | cc/100 in$^2$/24 hr. | 0.162 |
| Seal Strength | | | |
| (350° F., 1 sec dwell, 40 psi) | F-88 | Kgf/in | 4.3 |
| Gelbo Flex Crack | F-392 | | |
| 1000 cycles | | no. of Flex Cracks | 1 |
| 10,000 cycles | | no. of Flex Cracks | 8 |

Structure: PE/PE/tie/EVOH/tie/PE+O$_2$S/mPE
Film Sample 7: EVOH Only—7 Layer EVOH Coextrusion with Oxygen Scavenger

| Film Properties | ASTM | Units | Typical Values |
|---|---|---|---|
| Thickness | | mils | 3.6 |
| Yield | | in$^2$/lb | 8130 |
| Dart Impact | D-1709 | grams | 425 |
| Tensile Strength | | | |
| MD | D-882A | psi | 4225 |
| TD | | psi | 4065 |

-continued

| Film Properties | ASTM | Units | Typical Values |
|---|---|---|---|
| Elongation at Break | | | |
| MD | D-882A | % | 162 |
| TD | | % | 163 |
| Elmendorf Tear | | | |
| MD | D-1922 | grams | 372 |
| TD | | grams | 444 |
| Coefficient of Friction | | | |
| Inside to Inside | D-1894 | | 0.26 |
| Outside to Outside | | | 0.18 |
| Puncture | D-5748 | lb-in | 25 |
| Oxygen Transmission | | | |
| 73° F. @ 0% RH | D-3985 | cc/100 in²/24 hr. | 0.012 |
| Oxygen Transmission | | | |
| 73° F. @ 50% RH | D-3985 | cc/100 in²/24 hr. | 0.014 |
| Oxygen Transmission | | | |
| 73° F. @ 85% RH | D-3985 | cc/100 in²/24 hr. | 0.131 |
| Seal Strength | | | |
| (350° F., 1 sec dwell, 40 psi) | F-88 | Kgf/in | 4.2 |
| Gelbo Flex Crack | F-392 | | |
| 1000 cycles | | no. of Flex Cracks | 1 |
| 10,000 cycles | | no. of Flex Cracks | 5 |

Structure: PE/PE/tie/EVOH/tie/PE+O$_2$S/mPE

2× Concentration of Oxygen Scavenger as Sample 6

The tap discussed in PCT/US/2015/31926 that can be used with the various multilayer films disclosed herein is further described in detail below.

Figure 4:
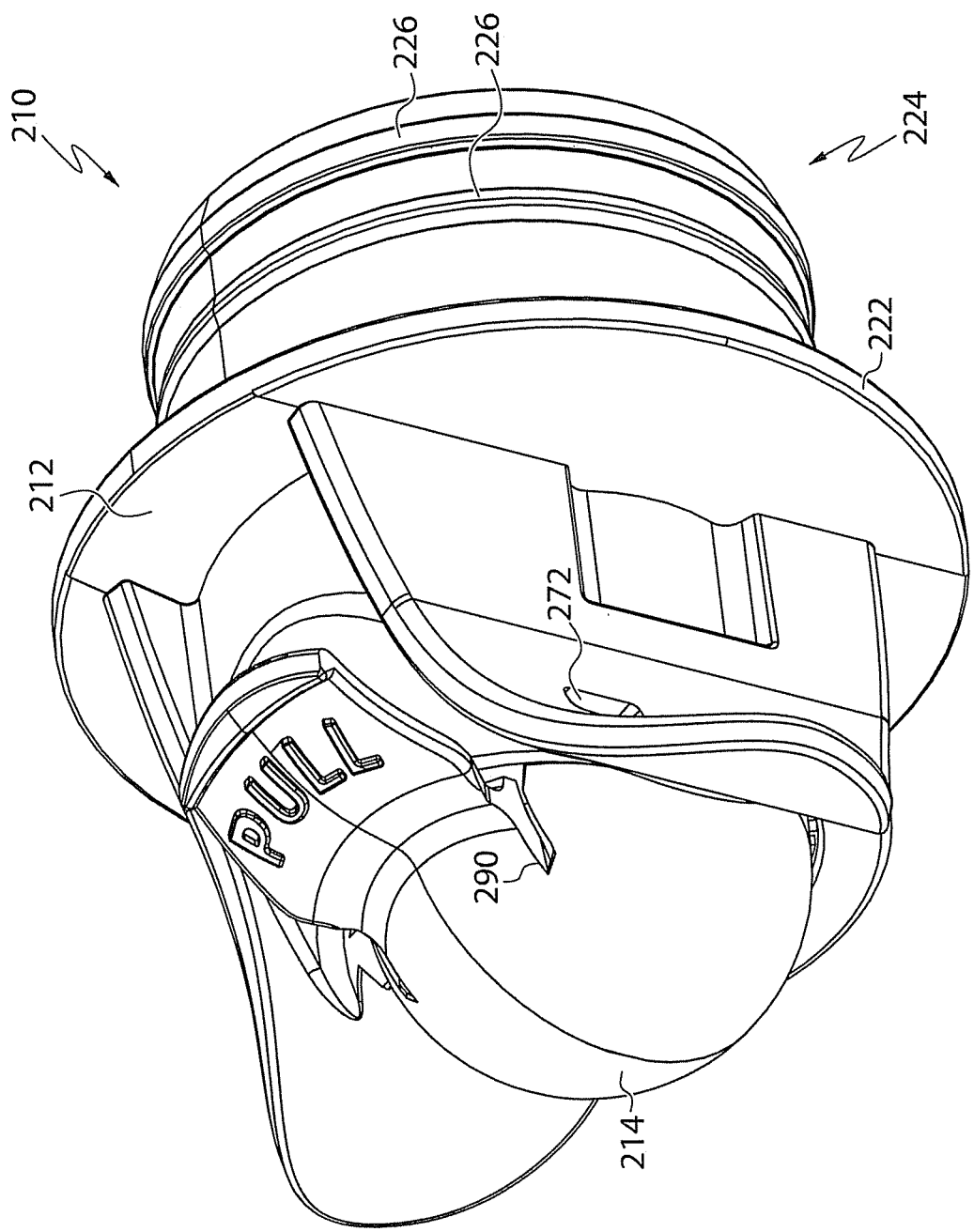
FIG. 4 shows a 3-dimensional view of an example of a fluid dispenser.
Figure 5:
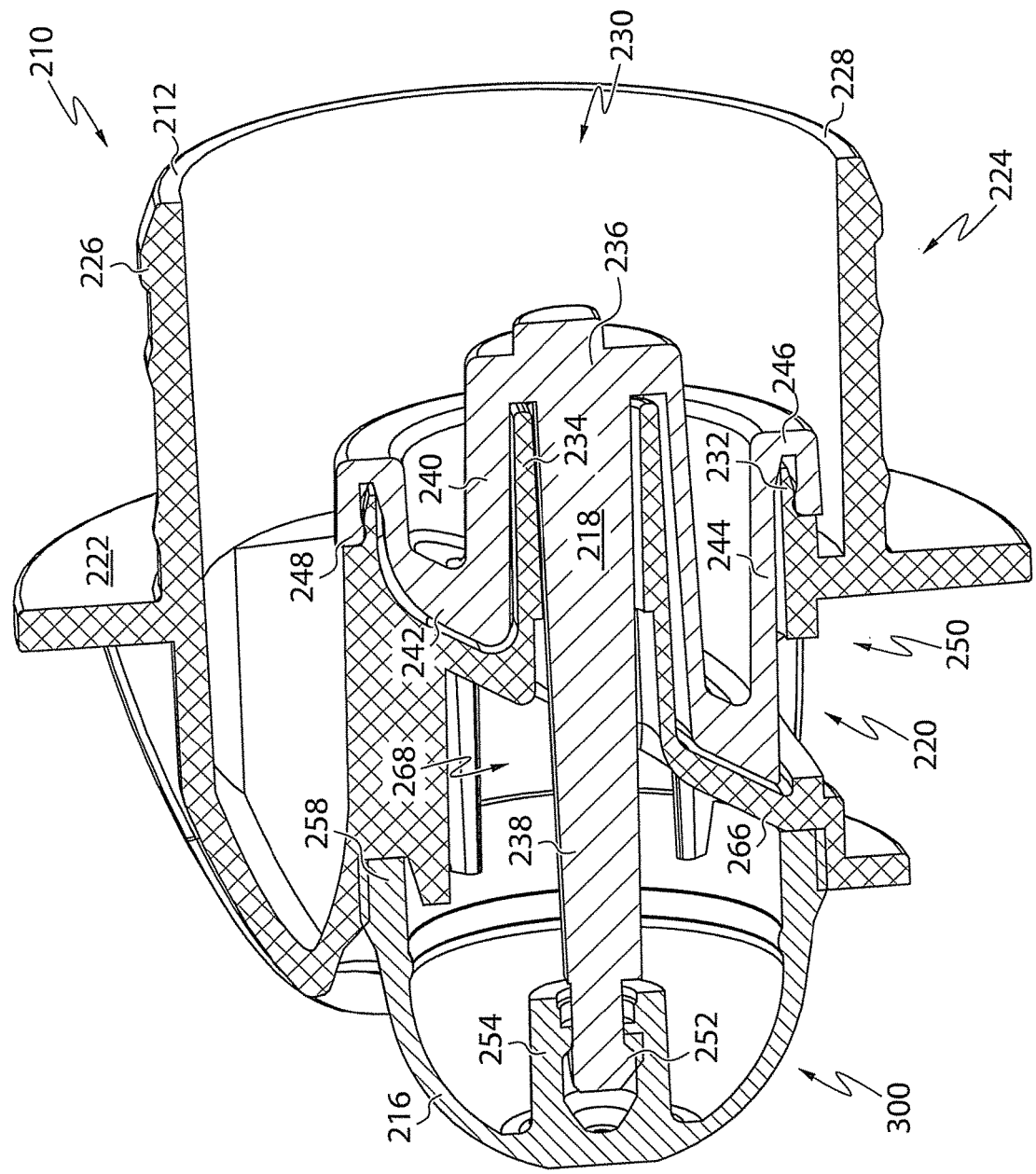
FIG. 5 shows a cutaway view of the fluid dispenser of FIG. 4.

With regard to FIG. 4, the main body 212 of the tap or fluid dispenser 210 is shown with a cap 214 attached thereto. In some embodiments, the cap 214 protects the dome member 216 (FIG. 5) and, prior to removal of the cap 214, shows evidence of tampering. As shown in FIG. 5, which is a cross-sectional view, the dome member 216 is coupled to a valve member 218. The valve member 218 is slidable within the main body 212 such that when the dome member 216 is pressed, fluid can flow out of a dispensing port 220.

The tap or fluid dispenser 212 may be made of a suitable plastic material. By way of example only, the fluid dispenser 212, or components of the dispenser 212 such as the main body 212, cap 214, and valve member 218, may be made of polypropylene. Furthermore, the fluid dispenser 212 or certain of its components may be made of plastic, such as polypropylene, that includes an oxygen scavenger component. By way of example only, the oxygen scavenger may be an iron oxide oxygen scavenger. Alternatively, the fluid dispenser 212 may include two layers, an inner layer and an outer layer. The inner layer of the dispenser 212, which comes in contact with liquid that passes through the dispenser 212 from the bag 126 (FIG. 3), may be made of a plastic material, such as polypropylene, that does not include an oxygen scavenger, and the outer layer of the dispenser 212 may be made of a plastic material, such as a polypropylene, that includes an oxygen scavenger component. In this way, the outer layer of the dispenser 212 that includes the oxygen scavenger does not come into contact with liquid that passes through the dispenser 212 and thus does not affect the taste of the liquid beverage. However, the oxygen scavenger component in the outer layer still can absorb oxygen that may leak from the headspace of the bag to which the dispenser 212 is connected. The oxygen scavenger may also absorb oxygen that passes through the film 10, 50 (FIGS. 1 and 2) into the bag 126 or that passes into the bag 126 through the tap 134. The two layers of the dispenser 212 may be made by a co-injection molding process. Such processes are known in the art.

In some embodiments, the main body 212 has a flange 222 and a coupler 224. The coupler 224 is configured to attach the main body 212 to a container (FIG. 3) in order to dispense fluid from the container via the fluid dispenser 210. In some embodiments, the coupler 224 has one or more ribs or beads 226 extending radially outwardly in order to provide a seal between the outlet (e.g., spout) of the container and the coupler 224. As shown, the beads 226 are provided on the outside of the coupler 224 such that the coupler 224 can be inserted into a female connection on the container. Other configurations are also contemplated, however. For example, the beads 226 can be disposed on the inside of the coupler 224. Further, the coupler 224 can have interior and/or exterior threads or any other suitable attachment or sealing mechanism. The coupler 224 can also be attached to a screw ring which can be attached to the container (not shown). In some embodiments, the coupler 224 includes three beads 226; however, any suitable number can be employed, for example 1, 2, 3, 4, 5, 6, 7 or more. Additionally, where multiple beads 226 are used, the beads 226 can be spaced apart from one another and spaced from the flange 222 and coupler end 228 (FIG. 5) in any suitable arrangement.

As further shown in FIG. 5, the main body 212 defines a cavity 230 which is partially bounded by the coupler 224. Further, in some embodiments, the main body 212 comprises a seal 232 that extends into the cavity 230. In some embodiments, the main body 212 comprises a guide 234 through which a portion of the valve member 218 extends.

Figure 13:
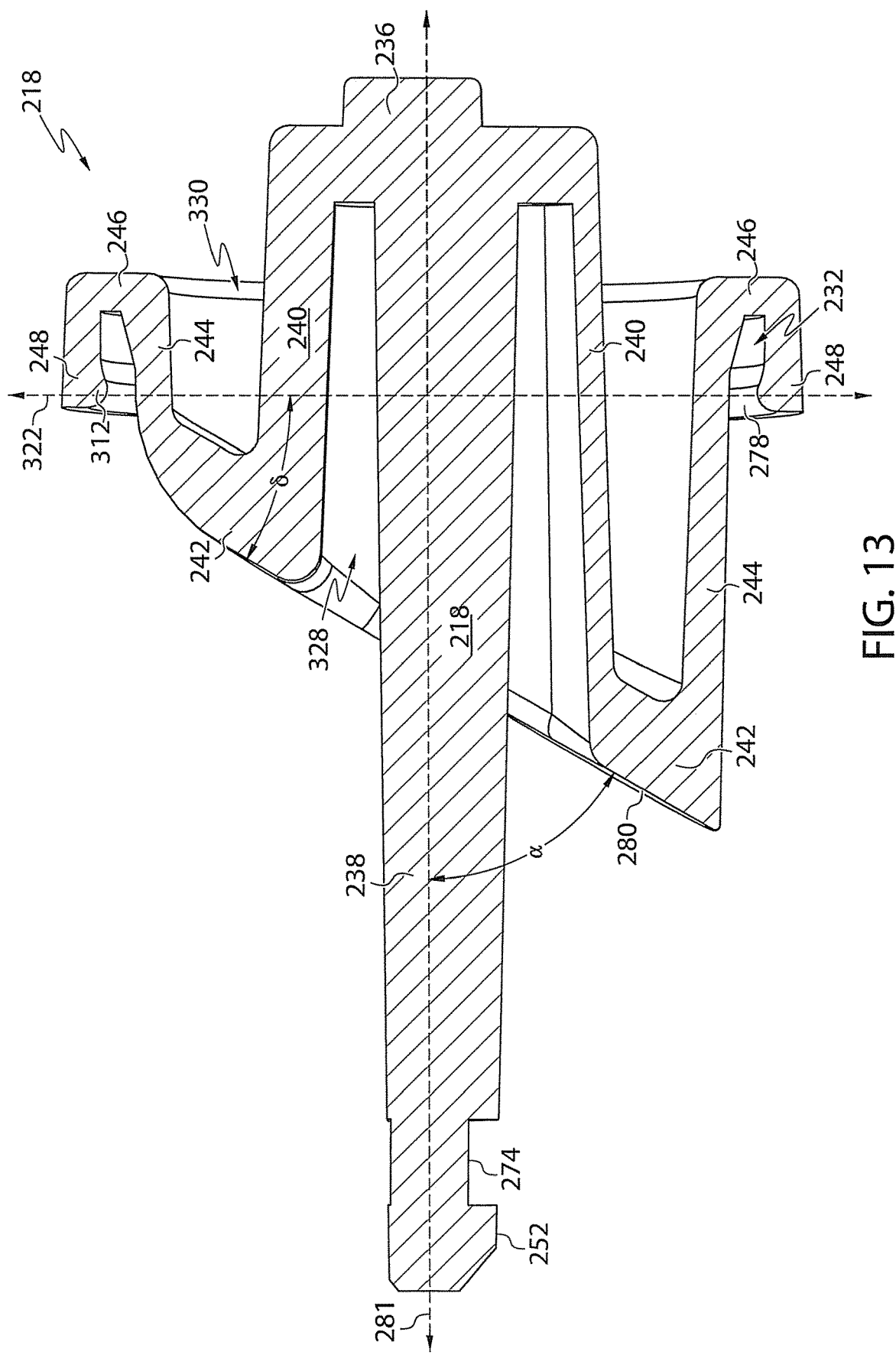
FIG. 13 shows a cutaway view of the valve member of FIGS. 11 and 12.

In some embodiments, the valve member 218 comprises a base portion 236, a stem 238 extending from the base portion 236, an inner tubular portion 240, an inner facing wall 242, and intermediate tubular portion 244, an outer facing wall 246, and an outer tubular portion 248. In some embodiments, the length of the intermediate tubular portion 244 varies around the periphery of the valve member 218. For example, in some embodiments, the intermediate tubular portion 244 is longer at the bottom of the valve member 218 than at the top of the valve member 218, as shown in FIGS. 5 and 13. In some embodiments, the length of the inner tubular portion 240 varies around the periphery of the valve member 218; for example, the length of the inner tubular portion 240 may be longer at the bottom of the valve member 218 than at the top of the valve member 218, as further shown in FIGS. 5 and 13. In some embodiments, the length of the intermediate tubular portion 244 is longer closer to the dispensing port 220 (FIG. 5) than further away from the dispensing port 220.

As shown in FIG. 5, the outer tubular portion 248 contacts the seal 232 of the main body 212 when the fluid dispenser 210 is in a sealed configuration 250, wherein fluid is prevented from flowing out of the fluid dispenser 210.

In some embodiments, a first channel 328 (FIG. 13) is formed between at least a portion of the stem 238 and at least a portion of the inner tubular portion 240. In some embodiments, a second channel 330 is formed between at least a portion of the inner tubular portion 240 and at least a portion of the intermediate tubular portion 244; the second channel may be further bounded by the inner facing wall 242. In some embodiments, a third channel 332 is formed between at least a portion of the intermediate tubular portion 244 and at least a portion of the outer tubular portion 248; the third channel may be further bounded by the outer facing wall 246, as shown for example in FIG. 13. In at least some embodiments, the first and third channels 328, 332 open in a direction opposing the second channel 330.

Although shown in FIGS. 5 and 13 with the valve member 218 having a third channel into which the seal 232 extends, it will be appreciated that the relationship can be reversed such that the main body 212 comprises a channel into which a portion of the valve member 218 extends.

In some embodiments, the valve member 218 further comprises a keeper 252 at the distal end portion of the stem 238. The keeper 252 interfaces with a retainer 254 of the dome member 216. The keeper 252 couples the valve member 218 to the dome member 216 such that the valve member 218 and dome member 216 move in tandem.

Figure 6:
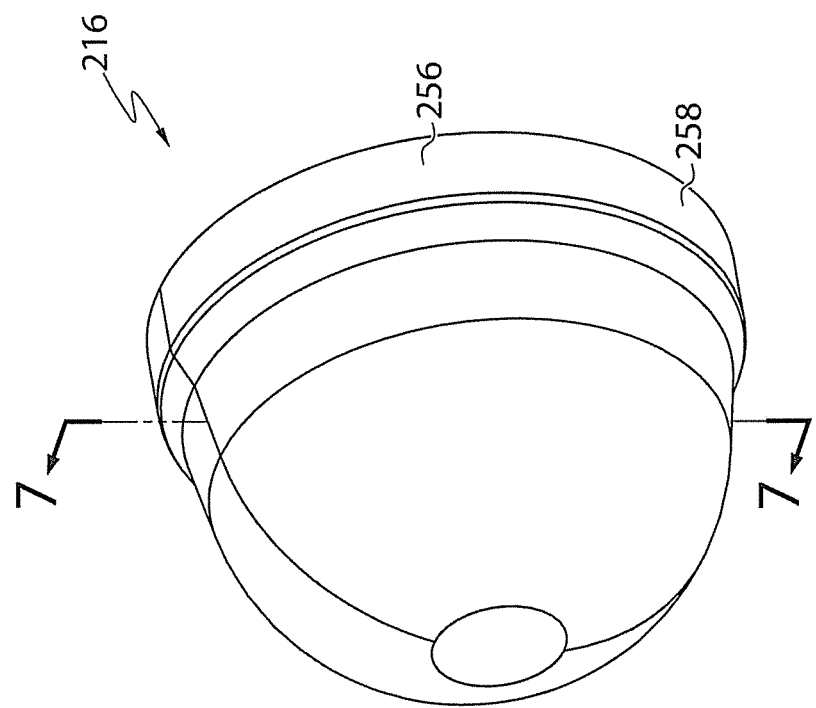
FIG. 6 shows a 3-dimensional view of an example of a dome member.
Figure 7:
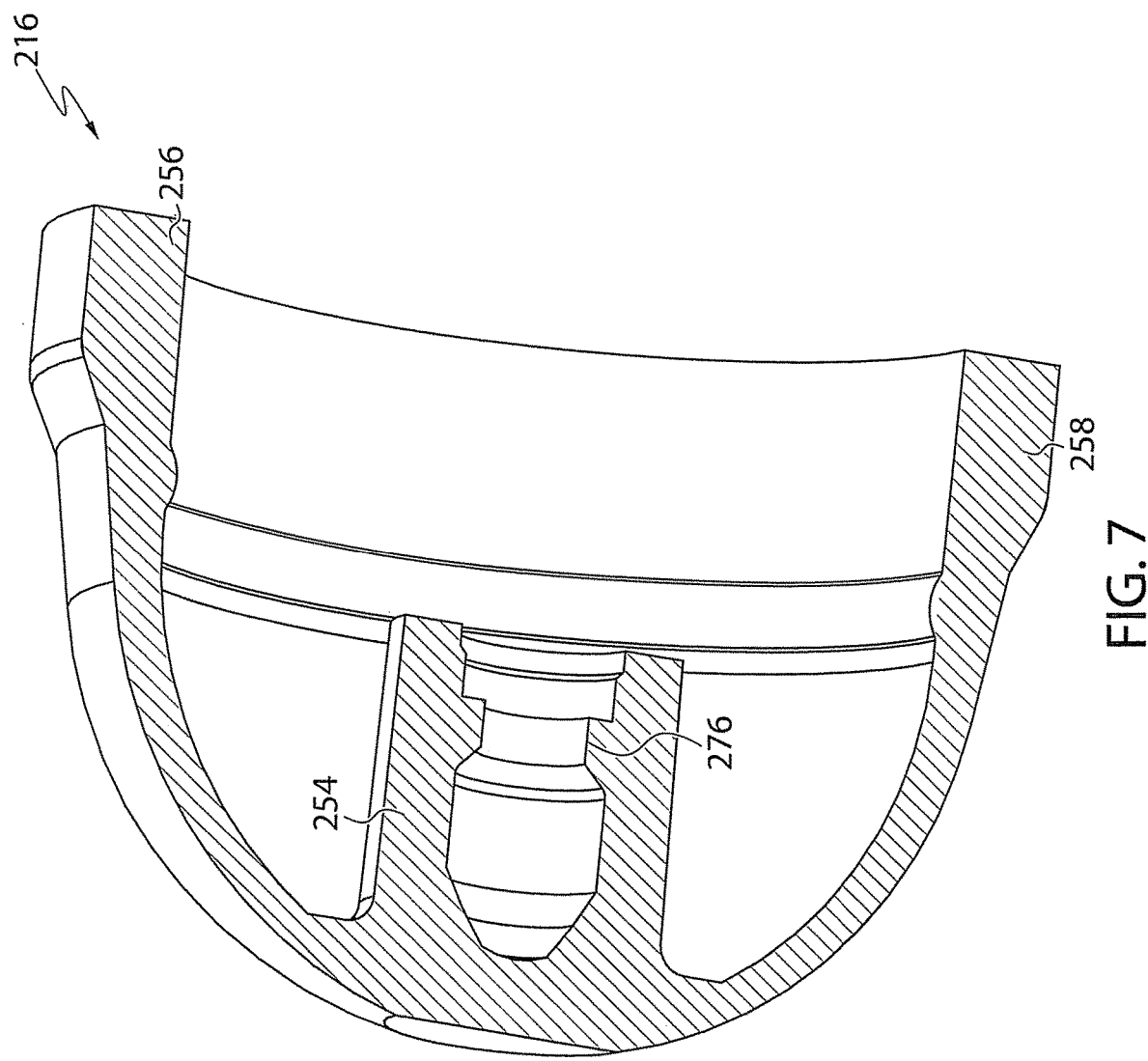
FIG. 7 shows a cutaway view of the dome member of FIG. 6.
Figure 10:
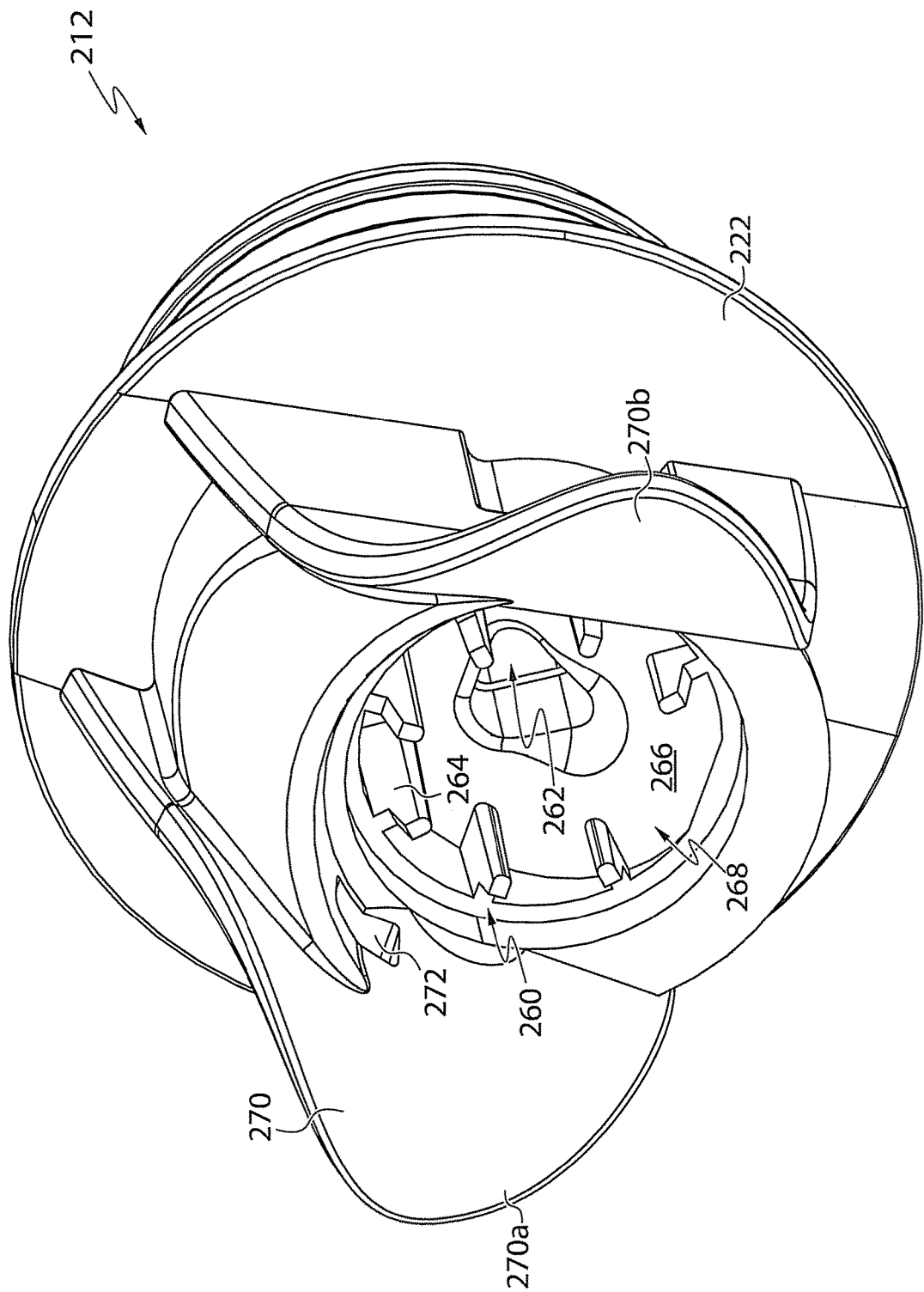
FIG. 10 shows a 3-dimensional view of the front of a main body of the fluid dispenser of FIG. 5.

With regard to FIGS. 6 and 7, the dome member 216 is shown therein in greater detail. In FIG. 7, the dome member 216 is shown in cross-section. The dome member 216 has a base 256. In some examples, as shown in FIGS. 6 and 7, the base 256 is circular. Other shapes and configurations are also contemplated, however; for example, the base 256 can also be square, rectangular, hexagonal, octagonal, or in the shape of any other suitable polygon. In some embodiments, the cross-section of material is thicker at the base 256 of the dome member 216 than nearer the peak of the dome member 216. At least some examples of the base 256 have a seat 258, which is configured to be received by the recess 260 (FIGS. 8 and 10).

In at least some examples, the dome member 216 comprises an elastomeric material. The dome member 216 is elastically deformable from a first configuration 300 (FIG. 5), wherein the fluid dispenser 210 is in a sealed configuration 250, to a second configuration 302 (FIG. 16), in which fluid is permitted to flow out of the fluid dispenser 210. The dome member 216 is predisposed to remain in the first configuration 300 unless a force is applied to it to depress the dome member 216. Thus, the dome member 216 pulls the valve member 218 closed, via keeper 252, as long the dome member 216 is not depressed.

Figure 8:
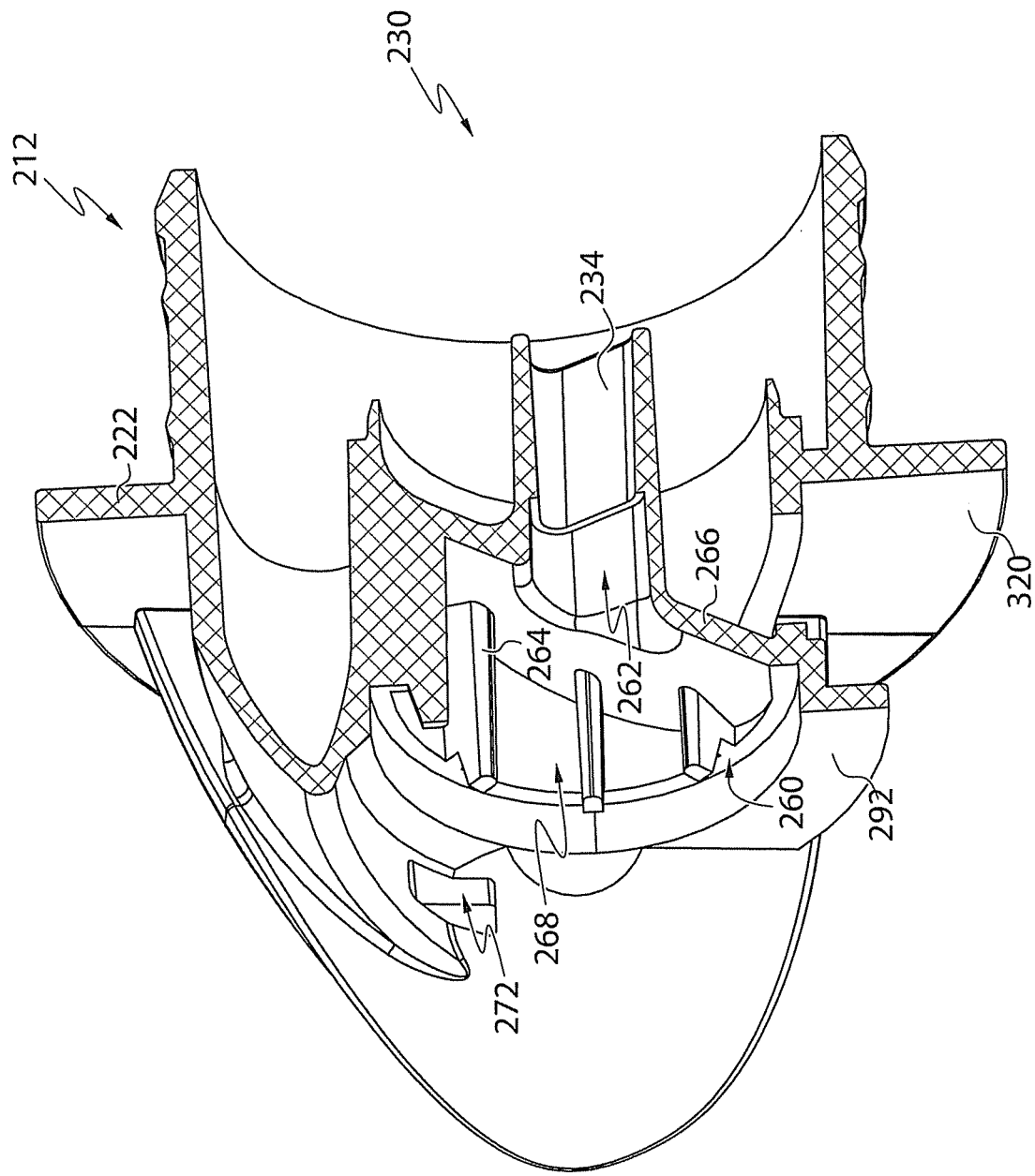
FIG. 8 shows a cutaway view of an example of a main body of the fluid dispenser of FIG. 5.
Figure 11:
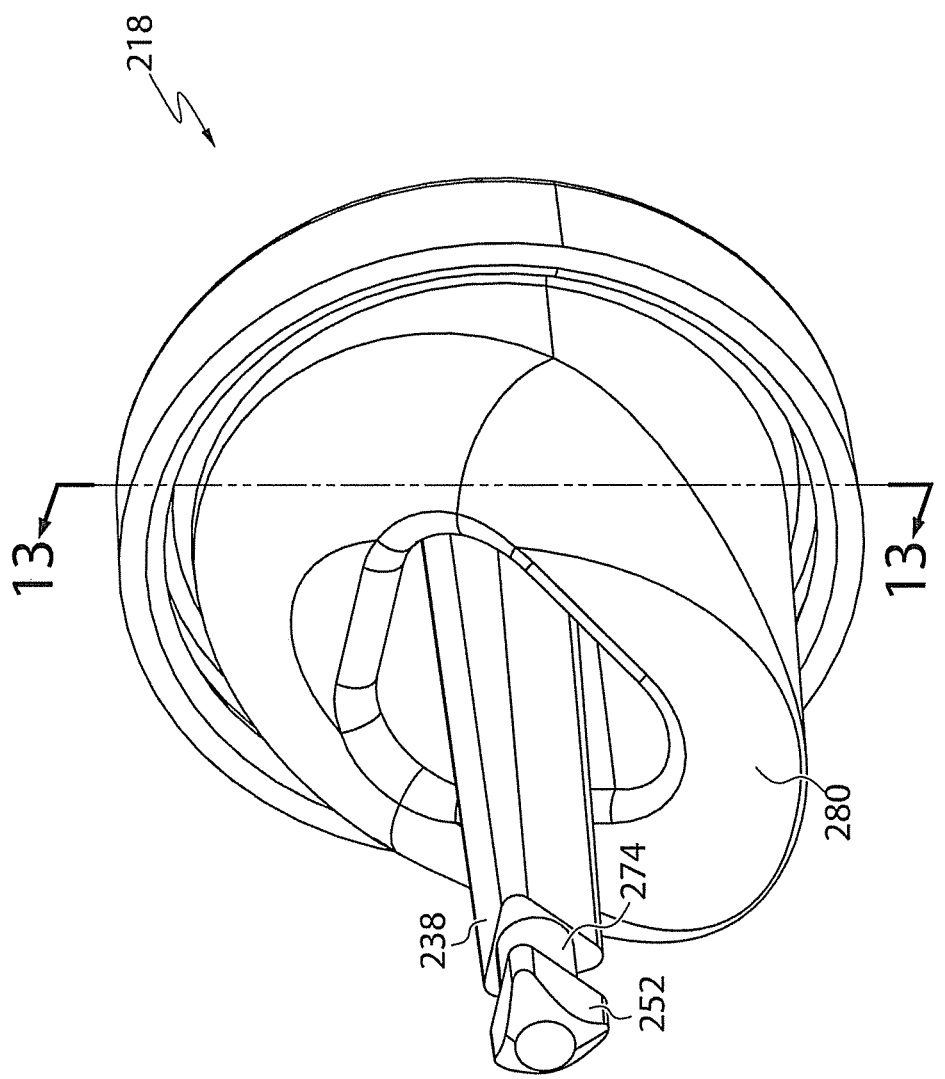
FIG. 11 shows a 3-dimensional view of an example of the valve member.
Figure 12:
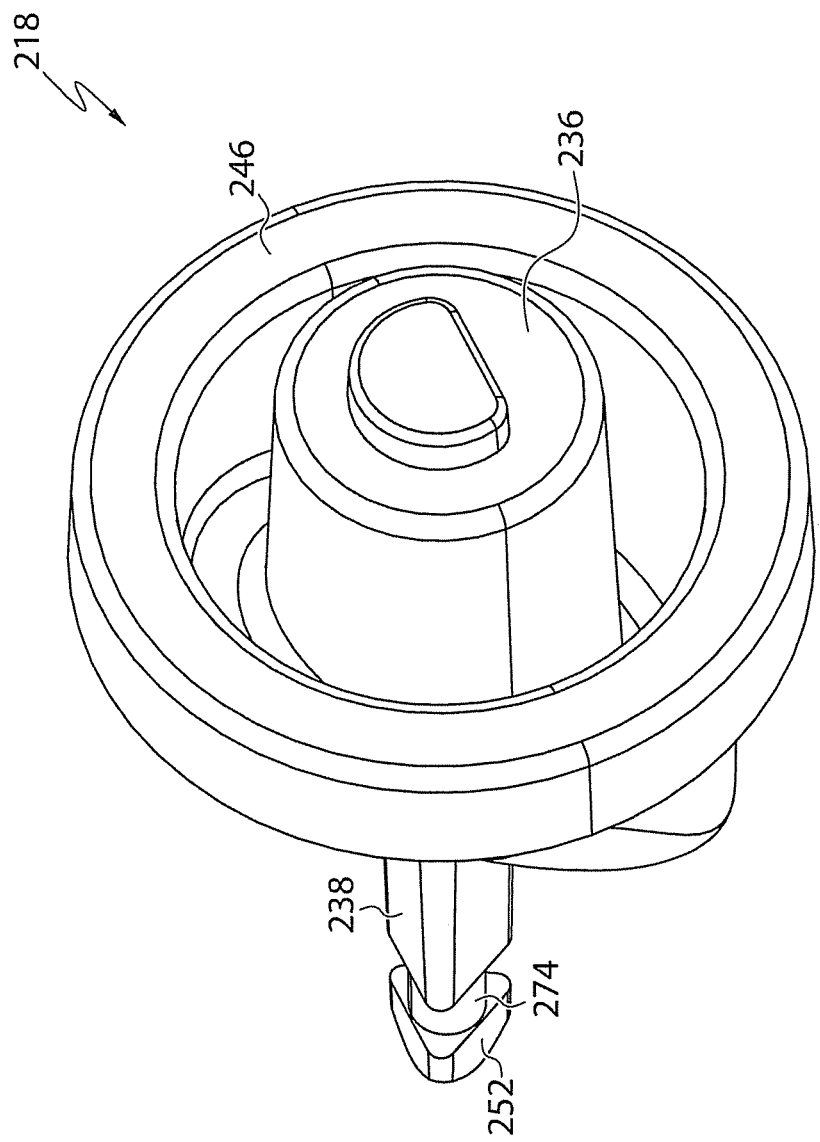
FIG. 12 shows a 3-dimensional view of an example of the valve member of FIG. 11.

Turning to FIG. 8, an example of the main body 212 is shown in the absence of the dome member 216, valve member 218, and cap 214. As shown, the guide 234 defines an opening 262 through which the stem 238 extends (FIG. 5). In some embodiments, the opening 262 is triangular in cross-section. Referring to FIGS. 11 and 12, in some embodiments, the stem 238 has a triangular cross-section to correspond with the triangular cross-section of the guide 234. The guide 234 can have any other suitable cross-sectional shape, for example circular, square, pentagonal, notched.

In some embodiments, the main body 212 comprises one or more stand-off members 264. As illustrated in FIG. 8, for example, a plurality of stand-off members 264 are employed. In some embodiments, the one or more stand-off members 264 are arranged to locate the dome member 216 within the recess 260. In some embodiments, the one or more stand-off members 264 (FIG. 8) abut the seat 258 (FIG. 7) of the dome member 216. Some examples of the main body 212 have at least three stand-off members 264. Some examples of the main body 212 have between three and fifteen stand-off members 264 and some embodiments have seven stand-off members 264, though any suitable number can be employed. Further, in at least some embodiments, the at least one stand-off member 264 is configured as a single stand-off member 264 having an annular shape; a semi-annular shape, for example with a segment cut out of it, can also be used.

Figure 9:
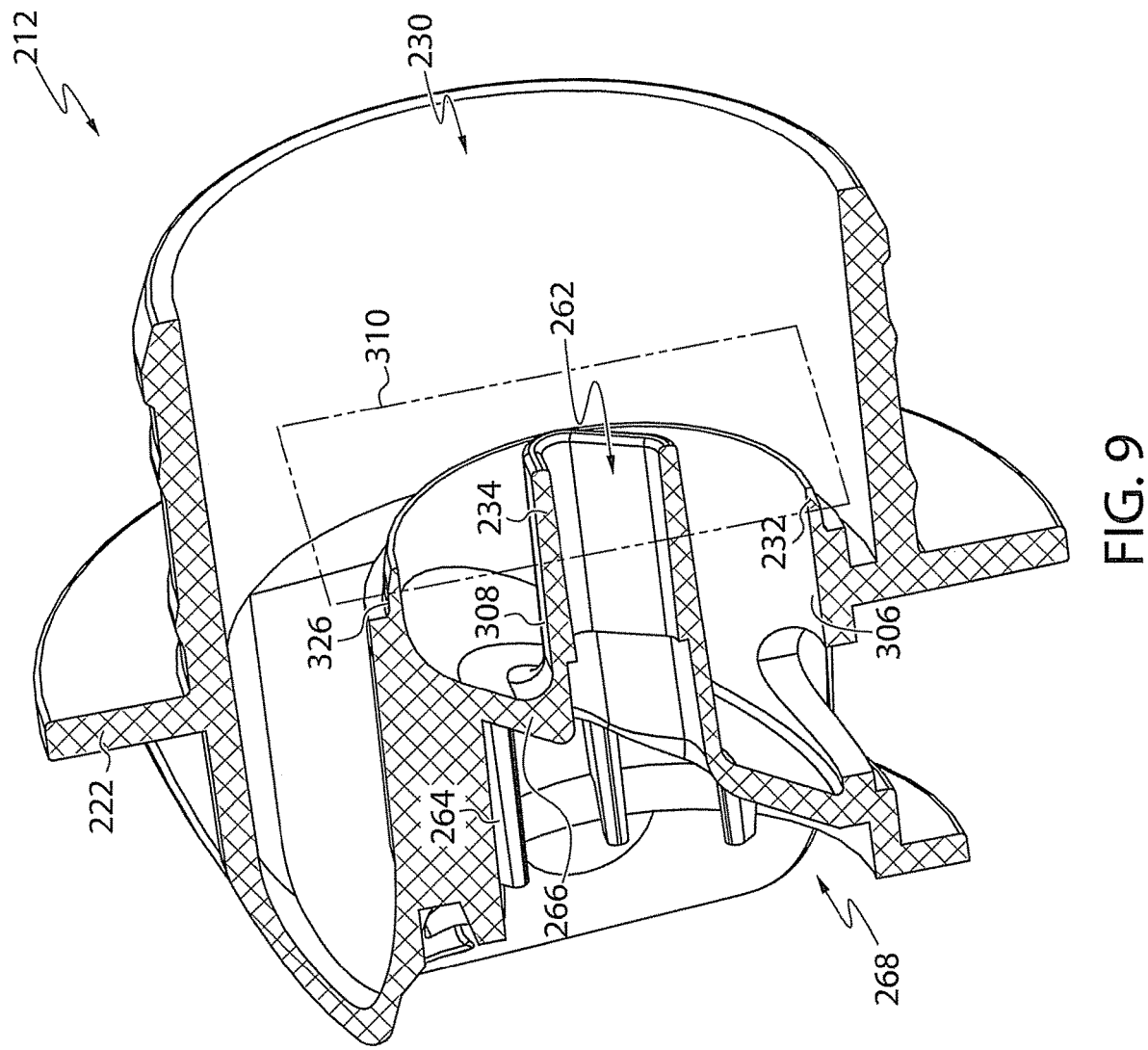
FIG. 9 shows another cutaway view of an example of a main body of the fluid dispenser of FIG. 5.
Figure 16:
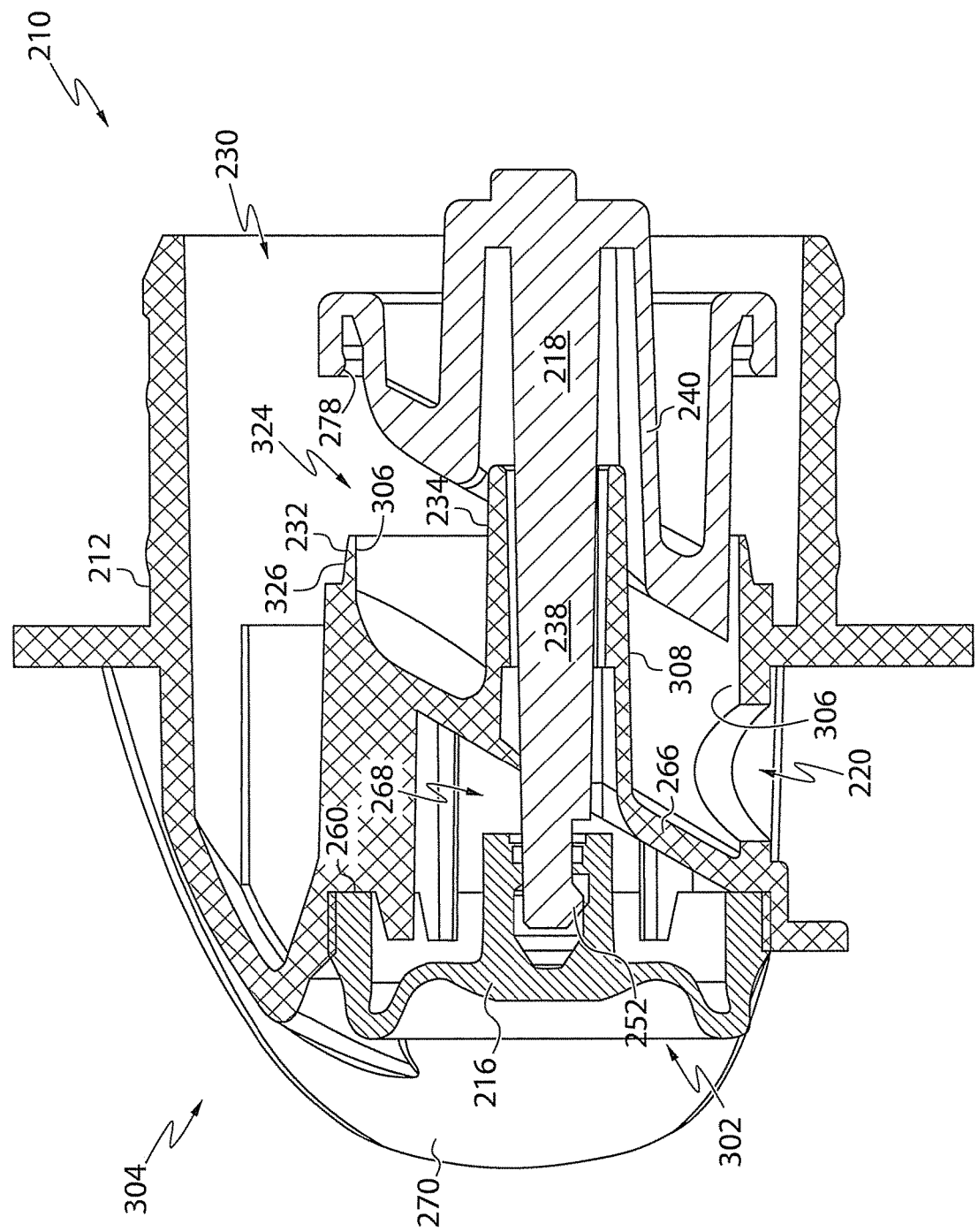
FIG. 16 shows a cutaway view of the fluid dispenser of FIG. 5 in an open or flow configuration.

With further regard to FIGS. 8 and 9, in some examples, the main body 212 has a dividing wall 266, separating the cavity 230 from the chamber 268. In some embodiments, the dividing wall 266 is oriented at a non-zero angle relative to a plane 320 (FIG. 8) defined by the flange 222. In some examples, the main body 212 comprises an outer flow surface 306 and an inner flow surface 308, for example as shown in FIGS. 9 and 16. In at least some examples, the dispensing port 220 forms an opening in the outer flow surface 306.

As shown in FIG. 10, in some embodiments, the main body 212 comprises one or more finger holds 270, for example two finger holds 270, which can be oriented in any suitable orientation. As illustrated, the finger holds 270 are configured such that the user's index finger is placed between one of the finger holds 270, for example 270a, and the flange 222 and the user's middle finger is placed between the other of the finger holds, for example 270b, and the flange 222. In this way, the user's thumb is used to depress the dome member 216 (FIG. 16) to dispense fluid.

In at least some examples, the main body 212 has one or more detents 272 (FIGS. 4, 8, 10). In some embodiments, the detents 272 retain the cap 214 (FIG. 15) until the cap 214 is removed, as discussed below. Some embodiments of the main body 212 have two opposing detents 272, which can take on any suitable configuration. In some examples, the detents 272 are openings extending through a portion of the respective finger hold 270a, 270b.

Turning to FIGS. 11-13, the valve member 218 is shown in detail; FIG. 13 is a cross-sectional view of the valve member 218. As illustrated, in some examples, the stem 238 has a generally triangular cross-section, corresponding to the cross-section of the opening 262 of the main body 212 (FIG. 10). Further, in some examples, the keeper 252 is located at a distal end of the stem 238. Just proximal of the keeper 252 is a narrowed portion 274 of the stem 238. The narrowed portion 274 fits into the catch 276 of the dome member 216 (FIG. 7), thereby coupling the dome member 216 and the valve member 218 so that they move in tandem.

The valve member 218 has a sealing surface 278 (FIG. 13) which contacts the seal 232 (FIG. 5) when the fluid dispenser 210 is in the sealed configuration 250. Due to the relatively large area of contact between the sealing surface 278 and the seal 232, the oxygen transmission rate into the fluid can be minimized. This is particularly important in certain industries, for example the wine industry.

With further regard to FIGS. 11 and 13, the valve member 218 has a face 280. In some examples, the face 280 is angled relative to the longitudinal axis 281 of the stem 238. Further, the face 280 is configured to abut, or nearly abut, the dividing wall 266 (FIG. 5) of the main body 212. In some embodiments, the face 280 is angled relative to the longitudinal axis 281 of the stem 238 by an angle $\alpha$, which is less than 90 degrees and, in some examples, is between 45 and 70 degrees. Angle $\alpha$ is measured between the longitudinal axis 281 and the face 280 from a location on the face 280 where the intermediate tubular portion 244 is at its longest (as measured parallel to the longitudinal axis 281 of the stem 238). In some embodiments, the face 280 is angled relative to the valve seal plane 322 (FIG. 13) by a nonzero angle $\delta$. The valve seal plane 322 is defined by a plane extending through the center of the sealing surface 278 along the periphery of the valve member 218. As illustrated in FIG. 13, the valve seal plane 322 extends into and out of the page. In some embodiments, the angle $\delta$ is between 20 and 45 degrees. In at least some embodiments, the longitudinal axis 281 is orthogonal to the valve seal plane 322.

Figure 14:
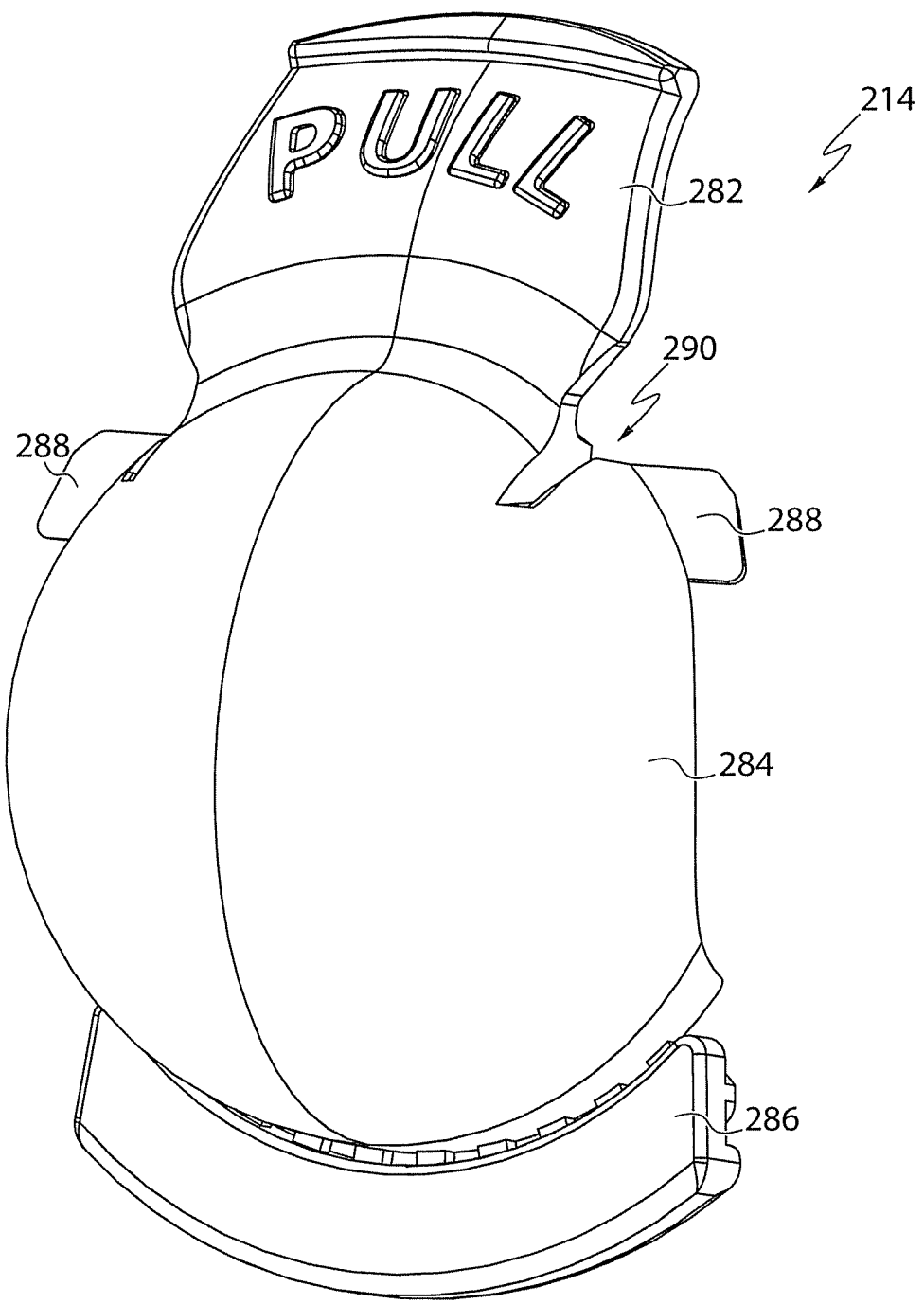
FIG. 14 shows a 3-dimensional view of an example of a cap.
Figure 15:
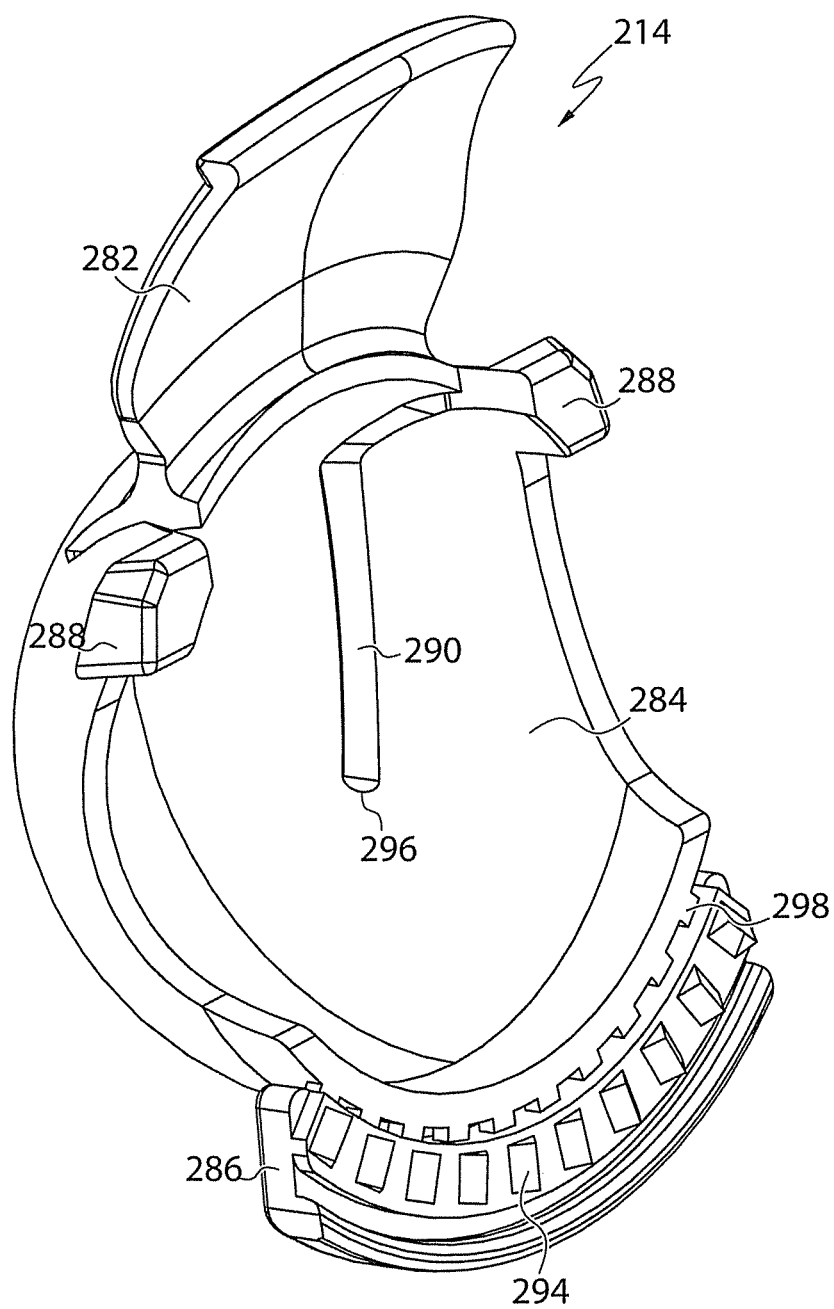
FIG. 15 shows 3-dimensional view of an example of the cap of FIG. 14.

FIGS. 14 and 15 show an example of the cap 214. Some embodiments of the fluid dispenser 210 have the cap 214 affixed thereto until the fluid dispenser 210 is used to dispense fluid, at which time the cap 214, or at least a portion thereof, is removed to provide access to the dome member 216. The cap 214 is configured to show evidence of tampering and, in at least some examples, once it is removed from the main body 212, it cannot be easily reattached.

The cap 214 has a tab 282, a body portion 284, and a bond strip 286. Extending from the body portion 284, the cap 214 comprises at least one ear 288. As illustrated in FIG. 15, for example, the cap 214 has two ears 288. The ears 288 snap-fit into the detents 272 (FIGS. 8 and 10) of the main body 212. Further, in some embodiments, the bond strip 286 is attached to a lip 292 (FIG. 8) of the main body 212. The bond strip 286 can be attached to the lip 292 in any desirable way, for example with adhesive or via ultrasonic welding. In some embodiments, the bond strip 286 has a plurality of teeth 294 (FIG. 15) which provide contact points to contact the lip 292. The teeth 294 are flattened during ultrasonic welding, for example, to yield a high strength bond between the bond strip 286 and the lip 292.

In some embodiments, the cap 214 has at least one tear strip 290. As shown in FIG. 4, for example, the cap 214 has two tear strips 290. In some examples, the tear strip(s) 290 extend entirely through the material of the body portion 284 along portion of length of the tear strip(s) 290. A shown in FIG. 14, for example, the tear strips 290 extend through the material near where the tab 282 adjoins the body portion 284. With regard to FIG. 15, as the tear strips 290 extend inwardly into the body portion 284 from the periphery of the cap 214, the tear strips 290 are thicker than nearer the periphery. Stated differently, the material thickness of the tear strips 290 increases along the length of the tear strip 290. The material thickness of the tear strips 290 is thinnest nearer the outer periphery of the cap 214. The thickness increases from the periphery until the tear strips 290 end at 296, where the material thickness of the tear strip(s) 290 is the same as the material thickness of the adjacent portion of the cap 214. Therefore, along a portion of the length of the tear strips 290, the tear strips 290 are reductions in the material thickness of the body portion 284.

Removal of the cap 214, for example by a user wishing to dispense fluid from the fluid dispenser 210, is carried out by pulling on the tab 282. As the tab 282 is pulled, the tear strips 290 begin to tear along their length and cracks propagate until the tear strips 290 end at 296. At this point, the ears 288 snap out of the detents 272 and the dome member 216 is partially exposed to the user. To remove the cap 214 entirely, such that the fluid dispenser 210 can be utilized, the user continues to pull on the tab 282, at which point the cap 214 fractures at the attachment columns 298 (FIG. 15). In this way, the bond strip 286 remains attached to the main body 212, and the body portion 284 and tab 282 of the cap 214 are removed from the bond strip 286 and are discarded.

With the cap 214 removed, the user can dispense fluid by depressing the dome member 216, as shown in FIG. 16, wherein the fluid dispenser 210 is in a flow configuration 304. In some examples, the dome member 216 elastically deforms to take on the second configuration 302 when it is depressed. The dome member 216 consequently moves the valve member 218 inwardly and sealing contact between the seal 232 and the sealing surface 278 of the valve member 218 is broken. As such, fluid is permitted to flow between the valve member 218 and the dividing wall 266 and out through the dispensing port 220. The fluid is further permitted to flow interiorly within the outer flow surface 306 and exteriorly to the inner flow surface 308 before exiting the fluid dispenser 210 via the dispensing port 220. A flow passage 324 (FIG. 16) extends from the cavity 230 and is at least partially bounded by the valve member 218 and main body 212 (e.g., outer flow surface 306, inner flow surface 308). In at least some embodiments, the flow passage 324 is a slanted passage, relative to the longitudinal axis 281 (FIG. 13), and at least a portion of the flow passage 324 extends 360 degrees around the stem 238.

Moreover, it will be appreciated that fluid is also permitted to flow past the guide 234, between the stem 238 and the guide 234, and into the chamber 268. Nonetheless, because the dome member 216 is sealed against the main body along recess 260, fluid is not permitted to exit the fluid dispenser 210 by any way other than through the dispensing port 220.

In order for the fluid to flow out of the fluid dispenser 210, it has to flow around the valve member 218. Due to the shape of the valve member 218, along with the guide 234 extending into the cavity 230, fluid must navigate a circuitous path. And, upon release of the dome member 216, the dome member 216 returns to its first configuration 300 (FIG. 5), the sealing surface 278 again comes into contact with the seal 232, and flow of fluid out of the dispensing port 220 ceases. Further, upon release of the dome member 216 and closure of the valve member 218, the fluid dispenser 210 can eliminate dripping.

Figure 17:
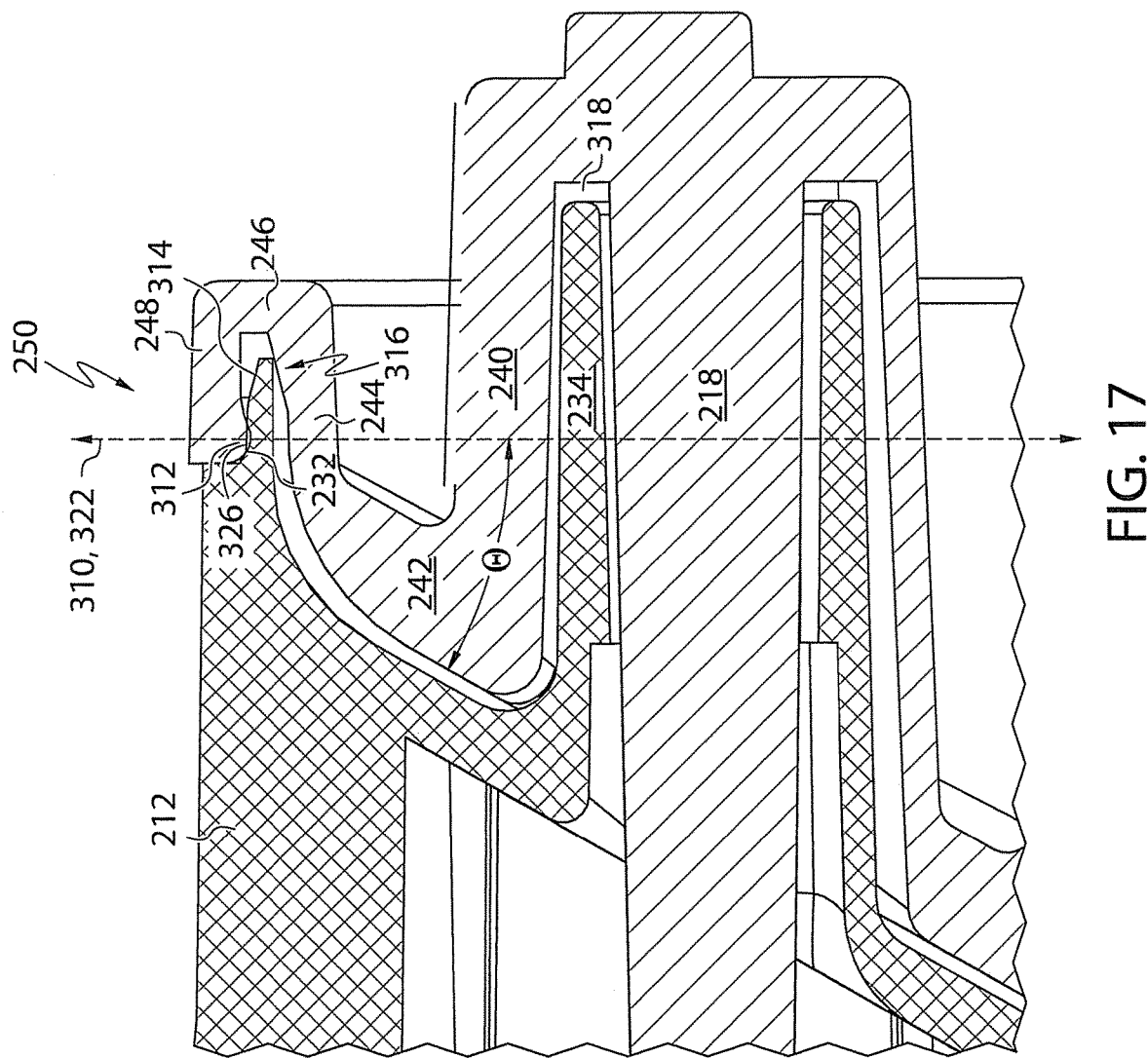
FIG. 17 shows a detailed cutaway view of the valve member and body of FIG. 16.

In some examples, flow of fluid out of the dispensing port 220 is reduced, however, upon release of the dome member 216 but prior to the sealing surface 278 sealing against seal 232. This is due in-part to the guide 234 extending a relatively long distance into the cavity 230. Further, because the inner tubular portion 240 overlaps a greater portion of the guide 234 at the bottom of the valve member 218 than at the top of the valve member 218, the flow of fluid around the valve member 218 is slowed prior to contact between the sealing surface 278 and the seal 232. And, in some embodiments, the face 280 is disposed at a non-zero angle, θ, relative to a sealing plane 310 (FIGS. 9, 17) such that fluid flow is reduced prior to contact between the sealing surface 278 and the seal 232. The sealing plane 310 is defined by a plane extending through the center of the contact surface 326 of the seal 232 such that at each location around the periphery of the seal 232, the center of the contact surface 326 lies on the sealing plane 310. The contact surface 326 is the surface of the seal 232 that mates with the sealing surface 278 when the fluid dispenser 210 is in the sealed configuration 250 (FIG. 17). In some embodiments, the non-zero angle θ is between 20 and 45 degrees. When the fluid dispenser 210 is in the sealed configuration 250, the sealing plane 310 and the valve seal plane 322 are coincident.

In at least some examples, when the fluid dispenser 210 is in the sealed configuration 250, there is no head pressure from the fluid within the container pushing outwardly on the dome member 216 because the sealing surface 278 and seal 232 are disposed between the dome member 216 and the fluid in the container. Additionally, head pressure from the fluid tends to aid in closing the fluid dispenser 210 by pushing the valve member 218 into the seal 232 of the main body 212.

With regard to FIG. 17, a detailed cross-sectional view of a portion of the valve member 218 is shown with a portion of the main body 212. As shown, the fluid dispenser 210 is in the sealed configuration 250.

In some examples, the outer tubular portion 248 has a lobe 312 (FIGS. 13 and 14) that contacts the seal 232. As the valve member 218 is closed, the lobe 312 moves toward the seal 232, ultimately sliding along incline 314 of the seal 232.

Subsequently, the lobe 312 moves past the incline 314 until the valve member 218 comes to rest against the main body 212 such that the sealing surface 278 contacts the contact surface 326.

Additionally, in some examples, the outer tubular portion 248 pushes the seal 232 inwardly toward the intermediate tubular portion 244. In some embodiments, the intermediate tubular portion 244 comprises a wedge 316. As the lobe 312 pushes the seal inwardly toward the intermediate tubular portion 244, the wedge 316 comes into contact with the distal most end of the seal 232. The wedge 316 contacts on opposite side of the seal 232 than the lobe 312. This arrangement prevents creep and deformation of the seal 232 over time in order to ensure proper sealing of the fluid dispenser 210, even after a period of shelf time or use. The seal 232 is prevented from undergoing too much deformation because it is situated between the wedge 316 and lobe 312. Moreover, the lobe 312 and shape of the seal 232 and valve member s18 provide a relatively large area of contact between the seal 232 and valve member 218, thereby reducing the oxygen transmission rate of the fluid dispenser 210.

In some examples, when the fluid dispenser 210 is in the sealed configuration 250, as shown in FIG. 17, a capillary gap 318 is disposed between the valve member 218 and the guide 234. The presence of the capillary gap 318 eliminates post-closure dripping.

In some embodiments, the main body 212 is made of HDPE (high density polyethylene), although other materials are also suitable. Further, in some embodiments, the valve member 218 is made of HDPE, though other materials are also suitable. In some embodiments, the cap 214 is made of HDPE, though other materials are also suitable. The main body 212, valve member 218, and cap 214 can all be made from the same HDPE or different HDPEs, for example having different hardnesses.

In some examples, the dome member 216 is made of a TPE (thermoplastic elastomer), although other materials can also be used.

Where plastics are used, the various components (e.g., dome member 216, main body 212, valve member 218, cap 214) can be injection molded and assembled. At least some examples of the fluid dispenser 210 are assembled by inserting the valve member 218 into the main body 212 such that stem 238 extends through the guide 234 (FIG. 5). The valve member 218 can be inserted into the main body 212 until it bottoms against the main body 212. Then, the dome member 216 is added to the main body 212 by inserting the keeper 252 (FIG. 13) into the retainer 254 (FIG. 7). Also, the dome member 216 is seated against the recess 260 (FIG. 10). Subsequently, the cap 214 is added by placing the ears 288 (FIG. 14) within the detents 272 (FIG. 8); the bond strip 286 (FIG. 15) is pressed against the lip 292 (FIG. 8) and the two are ultrasonically welded together.

In at least some examples, even when the dome member 216 is in the first configuration 300 (FIG. 5), it continues to exert an outward (closing) force against the valve member 218. This helps to ensure sealing between the valve member 218 and the main body 212 as well as between the dome member 216 and the main body 212.

As will be appreciated, the coupler 224 can have any desired length or configuration. The coupler 224 can be configured to attach to a bag-in-box container, bag container, box container, or any other container with standardized or non-standardized shape.

Further, some embodiments of the fluid dispenser 210 can utilize dome members 216 formed of a clear material, for example to allow the color of the fluid to be seen. In some examples, the dome member 216 is made from a colored material which can also be used to signify the type or flavor of fluid.

In at least some examples of the fluid dispenser 210, at least a portion of the valve member 218 (e.g., intermediate tubular portion 244) extends over at least a portion of the dispensing port 220 prior to sealing of the valve member 220 against the seal 232. In this way, the flow of fluid can be throttled and/or reduced prior to closure of fluid dispenser 210.

Figure 18:
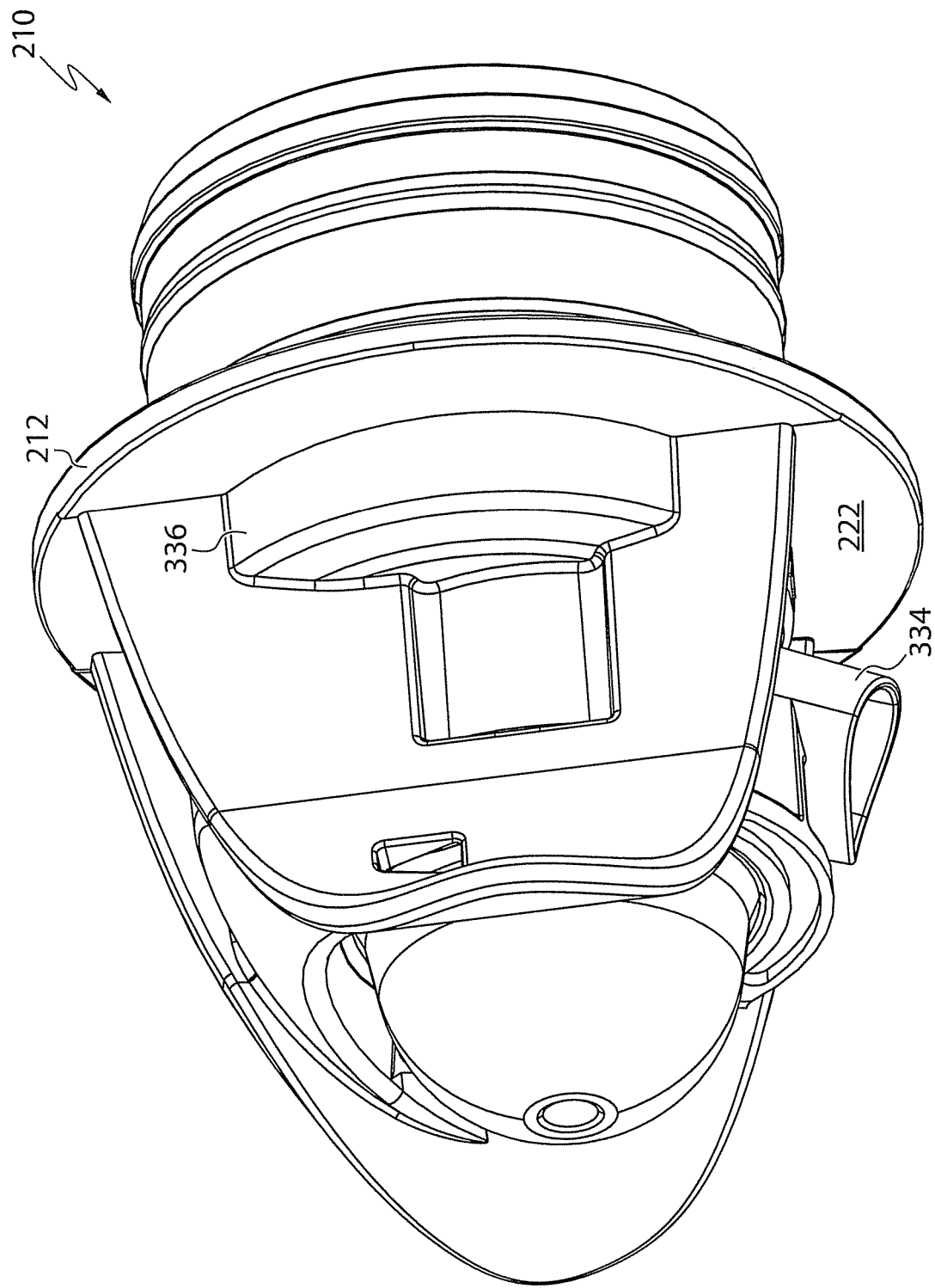
FIG. 18 shows a 3-dimensional view of an example of a fluid dispenser.
Figure 19:
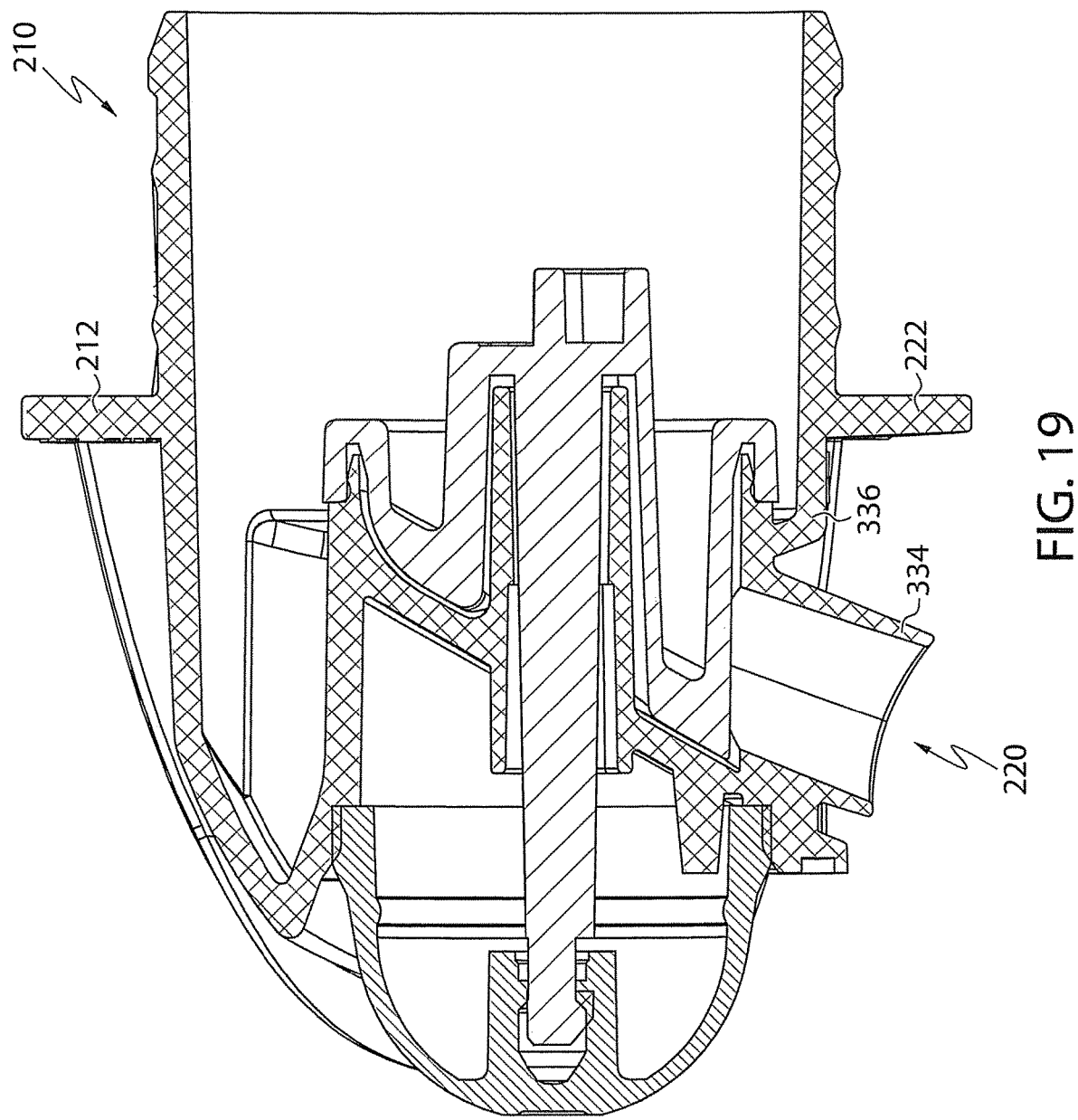
FIG. 19 shows a cutaway view of the fluid dispenser of FIG. 18.
Figure 20:
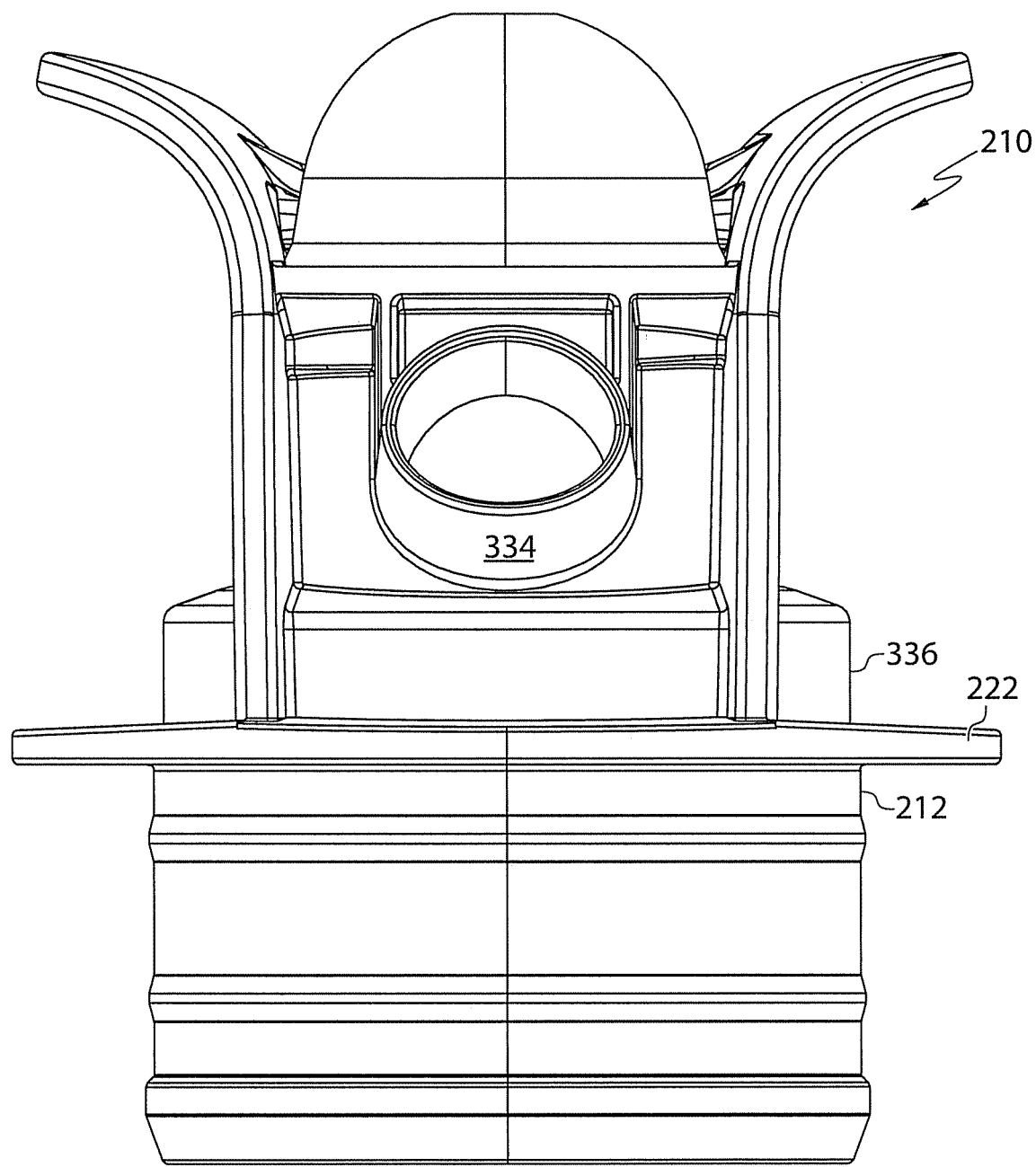
FIG. 20 shows a bottom view of the fluid dispenser of FIGS. 18 and 19.

FIGS. 18-20 show another example of a fluid dispenser 210. As shown, in some embodiments, the fluid dispenser 210 has a spout 334. In some embodiments, fluid is dispensed from the fluid dispenser 210 via the spout 334. In some embodiments, the spout 334 extends downwardly from the main body 212. Further, the spout 334 can extend away from the flange 222, permitting the user to position a rim of drinking vessel (e.g., glass or cup) between the flange 222 and the spout 334, thereby reducing the likelihood of spillage.

As further shown in FIGS. 18-20, in some embodiments, the body 212 comprises a barrel 336. In some embodiments, the barrel 336 extends from the flange 222 and provides a greater distance between flange 222 and the dispensing port 220, for example when compared to the embodiment shown in FIG. 5.

While endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon. In addition, while particular elements, embodiments and applications of the present invention have been shown and described, it will be understood that the invention is not limited thereto since modifications can be made by those skilled in the art without departing from the scope of the present disclosure, particularly in light of the foregoing teachings.

The invention claimed is:
1. A multilayer film for use in making a bag for bag in a box packaging, comprising:
 a first layer comprising a polyethylene material;
 a second layer adjacent the first layer comprising a polyethylene material;
 a third layer adjacent the second layer comprising an adhesive resin material;
 a fourth layer adjacent the third layer comprising a polyamide material;
 a fifth layer adjacent the fourth layer comprising an EVOH material;
 a sixth layer adjacent the fifth layer comprising a polyamide material;
 a seventh layer adjacent the sixth layer comprising an adhesive resin material;
 an eighth layer adjacent the seventh layer comprising a polyethylene material;
 a ninth layer adjacent the eighth layer comprising a ULDPE material;
 a tenth layer adjacent the ninth layer comprising a ULDPE material;
 an eleventh layer adjacent the tenth layer comprising a polyethylene material;
 a twelfth layer adjacent the eleventh layer comprising an adhesive resin material;

a thirteenth layer adjacent the twelfth layer comprising a polyamide material;
a fourteenth layer adjacent the thirteenth layer comprising an EVOH material;
a fifteenth layer adjacent the fourteenth layer comprising a polyamide material;
a sixteenth layer adjacent the fifteenth layer comprising an adhesive resin material;
a seventeenth layer adjacent the sixteenth layer comprising a polyethylene material, and
an eighteenth layer adjacent the seventeenth layer comprising a polyethylene material.

2. The film of claim 1, wherein the first layer is a sealant layer that contacts liquid in the packaging.

3. The film of claim 2, wherein the second and seventeenth layers further include an oxygen scavenger.

4. The film of claim 1, wherein the fourth, sixth, thirteenth, and fifteenth layers include nylon.

5. The film of claim 3, wherein the fifth and fourteenth layers have a mole percent ethylene content of 29%.

6. The film of claim 3, wherein the fifth and fourteenth layers have a mole percent ethylene content of 27%.

7. The multilayer film of claim 1, wherein the film is used to make a sealed pouch having an aperture to which is connected a spout, and the spout is connected to a fluid dispenser.

8. The multilayer film of claim 7, wherein the pouch has a thickness in the range of 35 to 150 microns.

9. The multilayer film of claim 1, wherein the film has an oxygen transfer rate of no more than 0.01 cc/100 in$^2$/24 hours at 0% relative humidity.

10. The multilayer film of claim 1, wherein the first, second, eighth, eleventh, seventeenth, and eighteenth layers comprise an LLDPE material.

* * * * *